(12) United States Patent
Ogata

(10) Patent No.: US 6,658,379 B1
(45) Date of Patent: Dec. 2, 2003

(54) WAVELET PROCESSING WITH LEADING AND TRAILING EDGE EXTRAPOLATION

(75) Inventor: Masami Ogata, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/155,936
(22) PCT Filed: Feb. 9, 1998
(86) PCT No.: PCT/JP98/00528
§ 371 (c)(1), (2), (4) Date: Mar. 4, 1999
(87) PCT Pub. No.: WO98/35449
PCT Pub. Date: Aug. 13, 1998

(30) Foreign Application Priority Data

Feb. 10, 1997 (JP) ............................................. 9-041682

(51) Int. Cl.⁷ ............................. H04N 7/26; H04N 7/32
(52) U.S. Cl. ........................ 704/203; 704/500; 348/398
(58) Field of Search ............................... 348/398, 441; 378/4; 382/268; 704/203, 500

(56) References Cited

U.S. PATENT DOCUMENTS

| | | | | |
|---|---|---|---|---|
| 5,666,163 A | * | 9/1997 | Lee et al. ..................... | 348/441 |
| 5,852,681 A | * | 12/1998 | Amaratunga et al. ....... | 382/268 |
| 5,929,912 A | * | 7/1999 | Aono et al. ................. | 348/398 |
| 5,953,388 A | * | 9/1999 | Walnut et al. .............. | 378/4 |
| 6,141,054 A | * | 10/2000 | Lee et al. ................... | 348/441 |

FOREIGN PATENT DOCUMENTS

| | | |
|---|---|---|
| JP | 4-77123 | 3/1992 |
| JP | 4-239893 | 8/1992 |
| JP | 6-338760 | 12/1994 |
| JP | 6-338761 | 12/1994 |
| JP | 8-9367 | 1/1996 |
| JP | 8-65667 | 3/1996 |

OTHER PUBLICATIONS

Wavelets: A Tutorial in Theory and Applications, by Charles Chai, Academic Press, Inc., pp 104–147, 359–379, 445–447 & 500–505, 1992.*

Wavelets and Subband Coding, Vetterli & Kovacevio, Prentice Hall, Chap 7., pp. 399–456.*

* cited by examiner

Primary Examiner—David D. Knepper
(74) Attorney, Agent, or Firm—Frommer Lawrence & Haug LLP; William S. Frommer; Darren M. Simon

(57) ABSTRACT

An data processing apparatus for performing signal processing on an input signal having a finite length. The apparatus performs a wavelet transform to divide the input signal into sub-bands for signal processing. An extrapolation process is performed to limit transform artifacts at the leading and trailing ends of each sub-band of the finite length signal. An extrapolation processing discriminator is used to determine whether the extrapolation process satisfies a complete reconstruction condition, whereby an output signal will be a substantial reconstruction of the input signal. The extrapolation process is chosen from among four different loopback methods.

32 Claims, 16 Drawing Sheets

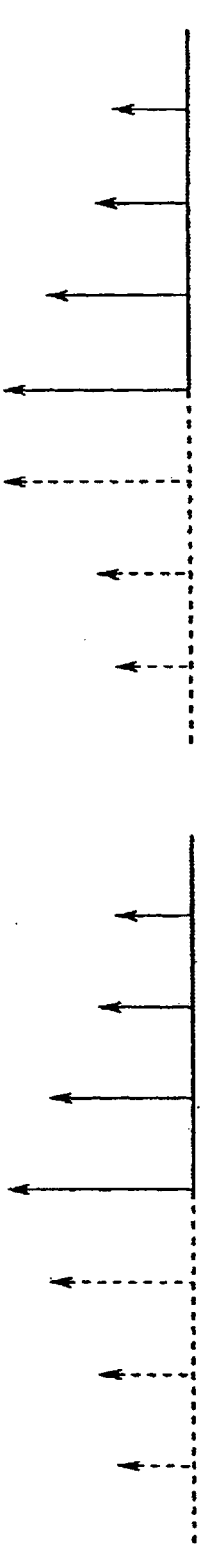
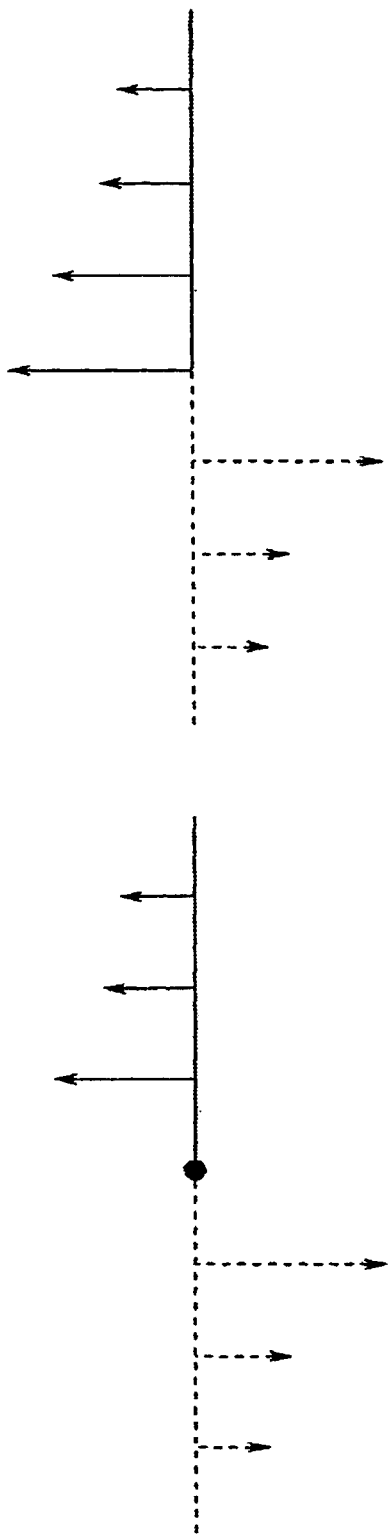
FIG.8A ZERO-SHIFT EVEN FUNCTION LOOPBACK METHOD (ZE)
FIG.8B ZERO-SHIFT ODD FUNCTION LOOPBACK METHOD (ZO)
FIG.8C HALF-SHIFT EVEN FUNCTION LOOPBACK METHOD (HE)
FIG.8D HALF-SHIFT ODD FUNCTION LOOPBACK METHOD (HO)

WAVELET PROCESSING WITH LEADING AND TRAILING EDGE EXTRAPOLATION

TECHNICAL FIELD

This invention relates to a data processing method and a data processing device for carrying out data processing by dividing data of a finite length into a plurality of frequency bands, which are applied to an AV equipment, a communication equipment and a database device for carrying out coding for the purpose of audio and video data compression or decoding thereof.

BACKGROUND ART

As a coding/decoding method for the purpose of compressing digital signals, a subband coding is employed. This subband coding is adapted for carrying out band division of digital signals by using a filter for carrying out wavelet transform (hereinafter referred to as a wavelet transform filter) so as to compress the digital signals. Specifically, subband coding is adapted for carrying out filtering processing on input signals by using a plurality of filters having different passbands and then carrying out down-sampling at an interval corresponding to each frequency band, so as to carry out compression utilizing the bias of energy of an output signal from each filter.

Signal processing by band division utilizing subband coding and wavelet transform is described in, for example, Martin Vetari, "Wavelet Transform and Subband Coding", Electronic Telecommunication Society, Vol. 1.74, No. 12, pp.1275–1278, December 1991.

In general, wavelet transform is defined as a narrower term or improvement of subband coding. However, the following description of wavelet includes a technique using not only a wavelet transform filter but also a filter applied to subband coding.

FIG. 1 shows the basic structure for band division and synthesis by wavelet transform and inverse wavelet transform. In FIG. 1, a one-dimensional signal x[i] is used as an input.

A wavelet transform unit 100 shown in FIG. 1 divides an input signal x[i] into signals xa'[j], xb'[j], xc'[j] . . . of plural frequency bands (subbands). An inverse wavelet transform unit 200 synthesizes the signals xa'[j], xb'[j], xc'[j] . . . divided into subbands so as to restore an input signal x"[i]. A signal processor 300 carries out predetermined processing on data which has been divided into the frequency bands. For example, in the case where coding processing is to be carried out, quantization, variable length coding, transmission, variable length decoding, and inverse quantization are carried out.

Specifically, in the wavelet transform unit 100, analysis filters 111, 112, 113 . . . carry out filtering for band division. Then, down-sampling units 121, 122, 123 . . . carry out down-sampling for storing data at a given sampling interval Di (i=1, 2, 3 . . . ) while thinning the other data with respect to data arrays xa[j], xb[j], xc[j] . . . of the individual frequency bands filtered and divided by the analysis filters 111, 112, 113 . . . , thereby generating the signals xa'[j], xb'[j], xc'[j] . . . of the individual frequency bands.

On the other hand, in the inverse wavelet transform unit 200, up-sampling units 211, 212, 213 . . . insert an appropriate number of zeros between two adjacent data with respect to the signals xa'[j], xb'[j], xc'[j] . . . of the individual frequency bands inputted thereto. The number of zeros to be inserted is equal to the number of samples (Di−1) of the data thinned by the corresponding down-sampling units 121, 122, 123 . . . Then, synthesis filters 221, 222, 223 . . . carry out filtering for interpolation with respect to data arrays xa"[j], xb"[j], xc"[j] . . . in which zero values are inserted. An adder 230 adds the data arrays xa"[j], xb"[j], xc"[j] . . . of the individual frequency bands interpolated by the synthesis filters 221, 222, 223 . . . so as to restore the input signal x[i] as the synthesis output signal x"[i].

An example where input data is divided into two subbands will now be described in detail. In this case, the two analysis filters 111, 112 in the wavelet transform unit 100 become a low-pass filter and a high-pass filter, respectively. These analysis low-pass filter 111 and analysis high-pass filter 112 divide the input signal x[i] into a low-frequency band signal XL[i] and a high-frequency band signal XH[i]. The down-sampling units 121, 122 carry out thinning for every sample with respect to each of the divided signals, as expressed by the following Equations (1) and (2).

$$XL[j]=XL[i], j=i/2 \qquad \text{Equation (1)}$$

$$XH[j]=XH[i], j=i/2 \qquad \text{Equation (2)}$$

In the inverse wavelet transform unit 200, first, the up-sampling units 211, 212 extend the sampling interval twice, and a sample having a zero value at the center position is inserted, as expressed by the following Equations (3) and (4).

$$XL[i]=XL[j] \ldots i=2\times j\ 0 \ldots i=2\times j1 \qquad \text{Equation (3)}$$

$$XH[i]=XH[j] \ldots i=2\times j\ 0 \ldots i=2\times j+1 \qquad \text{Equation (4)}$$

Then, the signals XL[i], XH[i] of the individual frequency bands obtained on up-sampling by the up-sampling units 211, 212 are supplied to the adder 230 through the synthesis low-pass filter 221 and the synthesis high-pass filter 222 corresponding to the analysis low-pass filter 111 and the analysis high-pass filter 112, respectively. The synthesis low-pass filter 221 and the synthesis high-pass filter 222 carry out interpolation on the output signals XL[i], XH[i] of the up-sampling units 211, 212. After that, the adder 230 adds the signals XL[i], XH[i] of the individual frequency bands, thereby restoring the input signal x[i] as the synthesis output signal x"[i].

The analysis low-pass filter 111 and the analysis high-pass filter 112 used in the wavelet transform unit 100, and the synthesis low-pass filter 221 and the synthesis high-pass filter 222 used in the inverse wavelet transform unit 200, are constituted to completely or proximately satisfy the relations of the following Equations (5) and (6).

$$H_0(-z)F_0(z)+H_1(-z)F_1(z)=0 \qquad \text{Equation (5)}$$

$$H_0(z)F_0(z)+H_1(z)F_1(z)=2z^{-L} \qquad \text{Equation (6)}$$

In Equation s (5) and (6), $H_0(z)$, $H_1(z)$, $F_0(z)$ and $F_1(z)$ represent transfer functions of the analysis low-pass filter 111, the analysis high-pass filter 112, the synthesis low-pass filter 221 and the synthesis high-pass filter 222, respectively, and L is an arbitrary integer. Under this constraint, if input data has an infinite length, it is ensured that the synthesis output signal x"[i] from the adder 230 in the inverse wavelet transform unit 200 completely or proximately coincides with the input signal x[i].

Exemplary filter coefficients of the analysis low-pass filter 111 and the analysis high-pass filter 112 and filter coefficients of the corresponding synthesis low-pass filter 221 and synthesis high-pass filter 222 are shown in the following Table 1.

TABLE 1

Coefficient of Wavelet Filter

| Analysis Filter Coefficient | | | | Synthesis Filter Coefficient | | | |
|---|---|---|---|---|---|---|---|
| Low-Pass Filter | | High-Pass Filter | | Low-Pass Filter | | High-Pass Filter | |
| [0] | 0.046875 | [0] | 0.500000 | [0] | 0.250000 | [0] | −0.023438 |
| [1] | −0.093750 | [1] | −1.000000 | [1] | 0.500000 | [1] | −0.046875 |
| [2] | −0.250000 | [2] | 0.500000 | [2] | 0.250000 | [2] | 0.125000 |
| [3] | 0.593750 | | | | | [3] | 0.296875 |
| [4] | 1.406250 | | | | | [4] | −0.703125 |
| [5] | 0.593750 | | | | | [5] | 0.296875 |
| [6] | −0.250000 | | | | | [6] | 0.125000 |
| [7] | −0.093750 | | | | | [7] | −0.046875 |
| [8] | 0.046875 | | | | | [8] | −0.023438 |

In the case where the above-described wavelet division/synthesis is used for coding, coding/decoding processing is carried out between the down-sampling units 121, 122 and the up-sampling units 211, 212.

The case where input data is divided into two subbands is explained above in detail. However, in coding for the purpose of compressing the data quantity, input data is divided into three or more subbands and each frequency band is recursively divided further, in order to carry out more efficient compression.

FIGS. 2 and 3 show the structures of an encoding device and a decoding device for a one-dimensional data array using wavelet transform.

In an encoding device 400 shown in FIG. 2, an analysis low-pass filter 411 and an analysis high-pass filter 412 on the first stage divide the input signal x[i] into a low-frequency band signal XL0[i] and a high-frequency band signal XH0[i]. The low-frequency band signal XL0[i] is supplied to a down-sampling unit 421, which carries out down-sampling similar to Equation (1). A low-frequency band signal XL0[j] obtained on down-sampling by the down-sampling unit 421 is further divided into a low-frequency band signal XL1[j] and a high-frequency band signal XH1[j] by an analysis low-pass filter 431 and an analysis high-pass filter 432 on the second stage. Then, the low-frequency band signal XL1[j] and the high-frequency band signal XH1[j] are supplied to down-sampling units 441, 442, respectively, which carry out down-sampling. On down-sampling by the down-sampling units 441, 442, a low-frequency band signal XL1[k] and a high-frequency band signal XH1[k] are generated.

On the other hand, the high-frequency band signal XH0[i] passed through the analysis high-pass filter 412 on the first stage is supplied to a down-sampling unit 422, which carries out down-sampling. Then, a high-frequency band signal XH0[j] obtained on down-sampling by the down-sampling unit 422 is inputted to a delay unit 434 for synchronizing with the low-frequency band signal.

The low-frequency band signal XL1[k] and the high-frequency band signal XH1[k] obtained on down-sampling by the down-sampling units 441, 442 and the high-frequency band signal XH0[j] delayed by the delay unit 434 are inputted to quantizers 451, 452 and 453, respectively, and quantized with corresponding quantization steps QL1, QH1 and QH0 as expressed by the following Equations (7), (8) and (9), respectively.

$$XL1'[k]=XL1[k]/QL1 \quad \text{Equation (7)}$$

$$XH1'[k]=XH1[k]/QH1 \quad \text{Equation (8)}$$

$$XH0'[j]=XH0[j]/QH0 \quad \text{Equation (9)}$$

Normally, for rounding of decimal fractions in calculating these Equations, decimal fractions not greater than 4 are rounded down. Quantized data XL1'[k], XH1'[k], XH0'[j] are inputted to a reversible coder/multiplexer 460, where reversible coding such as Huffman coding or arithmetic coding and multiplexing are carried out on the quantized data. The data are then transmitted to a decoding device 500 shown in FIG. 3 through a storage medium or a transmission line.

In the decoding device 500 shown in FIG. 3, first, an inverse multiplexer/reversible decoder 510 carries out decoding with respect to multiplexing and reversible coding carried out by the above-described encoding device 400, so as to restore the quantized data XL1'[k], XH1'[k], XH0'[j]. The quantized data XL1'[k], XH1'[k], XH0'[j] are inputted to different inverse quantizers 521, 522, 523, respectively. The inverse quantizers 521, 522, 523 carry out inverse transform of the quantization by the quantizers 451, 452, 453 of the encoding device 400, as expressed by the following Equations (10), (11) and (12).

$$XL1''[k]=XL1'[k]\times QL1 \quad \text{Equation (10)}$$

$$XH1''[k]=XH1'[k]\times QH1 \quad \text{Equation (11)}$$

$$XH0''[j]=XH0'[j]\times QH0 \quad \text{Equation (12)}$$

Of output signals XL1''[k], XH1''[k], XH0''[j] of the inverse quantizers 521, 522, 523, the low-frequency band signal XL1''[k] and the high-frequency band signal XH1''[k] corresponding to the band division on the second stage of the encoding device 400 are inputted to up-sampling units 531 and 532, respectively, where up-sampling similar to Equations (3) and (4) is carried out on the signals.

The low-frequency band signal XL1''[j] and the high-frequency band signal XH1''[j] obtained on up-sampling by the up-sampling units 531, 532 are inputted to an adder 550 through a synthesis low-pass filter 541 and a synthesis high-pass filter 542 having the relations of Equations (5) and (6) with the analysis low-pass filter 431 and the analysis high-pass filter 432, respectively. Then, the output signals from the synthesis low-pass filter 541 and the synthesis high-pass filter 542 are added by the adder 550 so as to be a low-frequency band signal XL0''[j] corresponding to the low-frequency band signal XL0[j] obtained by the band division on the first stage of the encoding device 400.

The high-frequency band signal XH0''[j], obtained by the inverse quantizer 523 and corresponding to the band division on the first stage, is inputted to a delay unit 535 and is delayed by the delay unit 535 by the time necessary for reconstructing the low-frequency band signal XL0''[j] corresponding to the band division on the first stage.

The low-frequency band signal XL0''[j] obtained by the adder 550 and the high-frequency band signal XH0''[j] delayed by the delay unit 535 are supplied to up-sampling units 561, 562, respectively, where up-sampling is carried out on the signals. The frequency band signals XL0''[i], XH0''[i] obtained on up-sampling by the up-sampling units 561, 562 are filtered by a synthesis low-pass filter 571 and a synthesis high-pass filter 572, respectively, and are supplied to an adder 580. Then, these frequency band signals XL0''[i], XH0''[i] are added and synthesized by the adder 580, thereby generating a restored signal x''[i] corresponding to the input signal x[i].

In this case, as the analysis low-pass filters 411, 431, the analysis high-pass filters 412, 432, the synthesis low-pass filters 541, 571, and the synthesis high-pass filters 542, 572, the same combination is used for all division levels.

However, different combinations of filters may be used for the respective levels.

FIGS. 4 and 5 show the structures of conventional examples of a two-dimensional picture encoding device and a two-dimensional picture decoding device using wavelet transform. An input signal x[i] is a data array obtained by scanning a two-dimensional picture in an order shown in FIG. 6.

In a two-dimensional picture encoding device 600 shown in FIG. 4, filtering is carried out four times in order to carry out band division in both horizontal and vertical directions on the picture, that is, low-pass filtering in the horizontal direction by analysis horizontal low-pass filters 611, 613, high-pass filtering in the horizontal direction by analysis horizontal high-pass filters 612, 614, low-pass filtering in the vertical direction by analysis vertical low-pass filters 641, 643, 645, 647, and high-pass filtering in the vertical direction by analysis vertical high-pass filters 642, 644, 646, 648.

Individual frequency band signals passed through the analysis horizontal low-pass filter 611 and the analysis horizontal high-pass filter 612 on the first stage are down-sampled by down-sampling units 621, 622, respectively, and then inputted to the analysis vertical low-pass filters 641, 643 and the analysis vertical high-pass filters 642, 644 on the second stage through memories 631, 632, respectively. A low-frequency band signal passed through the analysis vertical low-pass filter 641 is down-sampled by a down-sampling unit 651, and then inputted to the analysis horizontal low-pass filter 613 and the analysis horizontal high-pass filter 614 on the third stage. Individual frequency band signals passed through the analysis horizontal low-pass filter 613 and the analysis horizontal high-pass filter 614 are down-sampled by down-sampling units 623, 624, and then inputted to the analysis vertical low-pass filters 645, 647 and the analysis vertical high-pass filters 646, 648 on the fourth stage through memories 633, 634, respectively. The individual frequency band signals passed through the analysis vertical low-pass filters 645, 647 and the analysis vertical high-pass filters 646, 648 on the fourth stage are down-sampled by down-sampling units 655, 656, 657, 658, and then inputted to quantizers 661, 662, 663, 664, where the individual frequency band signals are quantized with corresponding quantization steps.

On the other hand, individual frequency band signals passed through the analysis vertical low-pass filter 643 and the analysis vertical high-pass filter 642, 644 are down-sampled by down-sampling units 653, 652, 654, respectively, and then passed through delay units 636, 635, 637 in order to be synchronized with the low-frequency band signal. The individual frequency band signals are then inputted to quantizers 666, 665, 667, respectively, where the signals are quantized with corresponding quantization steps.

Quantized data quantized by the quantizers 661 to 667 are inputted to a reversible coder/multiplexer 670, where reversible coding such as Huffman coding or arithmetic coding and multiplexing are carried out. The data thus obtained are transmitted to a decoding device 700 shown in FIG. 5 through a storage medium or a transmission line.

In the decoding device 700 shown in FIG. 5, first, an inverse multiplexer/reversible decoder 710 carries out decoding with respect to multiplexing and reversible coding carried out by the above-described encoding device 600, so as to restore the quantized data. These data are inputted to inverse quantizers 721 to 727, where inverse transform of the transform by quantizers 661 to 667 is carried out.

In this decoding device 700, filtering for interpolation corresponding to the encoding device 600 is carried out by memories 731 to 738, vertical up-sampling units 741 to 748, synthesis vertical low-pass filters 751, 753, 755, 757, synthesis vertical high-pass filters 752, 754, 756, 758, adders 761 to 766, horizontal up-sampling units 771 to 774, synthesis horizontal low-pass filters 781, 783, and synthesis horizontal high-pass filters 782, 784.

The vertical down-sampling units 651 to 658 in the encoding device 600 carry out down-sampling in the vertical direction on the picture, that is, thinning of each one line. On the contrary, the vertical up-sampling units 741 to 748 in the decoding device 700 carry out processing to insert one line having all zeros between inputted lines. The memories 731 to 738 are line memories for temporarily storing a necessary number of lines in order to carry out the above-described vertical processing on the incoming individual frequency band signals scanned in the horizontal direction.

Although, in this case, the same filters are used in the horizontal direction and in the vertical direction, different sets of filters may be used in the respective directions.

In the conventional wavelet transform and inverse wavelet transform, a method for extrapolation for filtering at the data terminal end position of each frequency band signal is experientially determined in most cases.

The analysis filters and the synthesis filters used for wavelet transform and inverse wavelet transform as described above are constituted to completely or proximately satisfy the conditions of reconstruction with respect to data of an infinite length. In actual application, however, since the data length is finite, the reconstruction conditions are not necessarily completely satisfied unless data necessary for convolution processing at the terminal end of a data array is appropriately extrapolated. Failure in the complete reconstruction conditions due to such inappropriate extrapolation does not cause any problem in the case where wavelet transform is used only for the purpose of analysis such as edge detection in picture processing, but causes serious problems in picture compression requiring analysis/synthesis processing.

Also, the influence of extrapolation appears only near the leading end and the trailing end of the data array, and its range is considered to be approximately half the number of taps of the filter used. Therefore, if the data length is sufficiently large with respect to the number of taps of the filter, the influence of extrapolation is small as a whole. However, in picture compression using wavelet transform, normally, division of subbands on the low-frequency side is normally repeated to generate a plurality of subbands. Therefore, as division proceeds, the data length to be convolved becomes relatively small with respect to the taps of the filter used, and the influence of extrapolation is dispersed in a broad range.

OBJECTS AND SUMMARY OF THE INVENTION

Thus, it is an object of the present invention to provide a data processing method and a data processing device which enable wavelet transform and inverse wavelet transform of high performance by using appropriate extrapolation.

It is another object of the present invention to provide a data processing method and a data processing device which enable accurate and appropriate judgment of extrapolation.

It is still another object of the present invention to provide a data processing method and a data processing device which enable realization of wavelet transform and inverse wavelet transform satisfying complete reconstruction conditions within a range of precision ensured by a filter used for wavelet transform and inverse wavelet transform even with respect to a data array of a finite length.

It is still another object of the present invention to provide a data processing method and a data processing device which enable resetting of conditions of a filter used, when an extrapolation method provided from outside is inappropriate.

It is still another object of the present invention to provide a data processing method and a data processing device which enable continuation of processing even when an extrapolation method provided from outside is inappropriate.

It is still another object of the present invention to provide a data processing method and a data processing device which enable selection of useful four loopback methods as extrapolation methods.

It is still another object of the present invention to provide a data processing method and a data processing device which enable easy discrimination as to whether complete reconstruction conditions are satisfied or not.

It is still another object of the present invention to provide a data processing method and a data processing device which enable extrapolation such that complete reconstruction conditions are satisfied even when extrapolation data is insufficient by one loopback operation because of the length of a filter used (the number of taps) which is large in comparison with the length of a data array.

It is still another object of the present invention to provide a data processing method and a data processing device which enable discrimination as to whether complete reconstruction conditions are satisfied or not when extrapolation data is insufficient by one loopback operation because of the length of a filter used (the number of taps) which is large in comparison with the length of a data array.

It is still another object of the present invention to provide a data processing method and a data processing device which enable discrimination of appropriate extrapolation by verifying all possible combinations of extrapolation methods at the leading end and the trailing end of a data array.

It is still another object of the present invention to provide a data processing method and a data processing device which enable resetting of conditions of a filter used, when there exists no appropriate combination of loopback methods at the leading end and the trailing end of a data array.

It is still another object of the present invention to provide a data processing method and a data processing device which enable continuation of processing even when there exists no appropriate combination of loopback methods at the leading end and the trailing end of a data array.

It is still another object of the present invention to provide a data processing method and a data processing device which enable extrapolation without causing discontinuity of data at terminal ends of a data array.

It is still another object of the present invention to provide a data processing method and a data processing device which enable accurate discrimination of an appropriate extrapolation method with respect to an analysis filter and prediction of appropriate extrapolation with respect to a corresponding synthesis filter.

It is still another object of the present invention to provide a data processing method and a data processing device which enable accurate discrimination as to whether complete reconstruction conditions are satisfied or not when extrapolation data is insufficient by one loopback operation because of the length of a filter used (the number of taps) which is large in comparison with the length of a data array.

It is still another object of the present invention to provide a data processing method and a data processing device which enable accurate prediction of an appropriate extrapolation method with respect to a synthesis filter.

It is still another object of the present invention to provide a data processing method and a data processing device which enable easy determination of an appropriate extrapolation method with respect to an analysis filter and a synthesis filter only from the number of taps of the filters, under conditions used at a high frequency.

It is still another object of the present invention to provide a data processing method and a data processing device which enable sat i s faction of complete reconstruction conditions even in the case where division of obtained subbands is repeated for a plurality of times and where a different analysis filter is used for each division.

It is still another object of the present invention to provide a data processing method and a data processing device which enable coding/decoding processing of high performance using wavelet transform and inverse wavelet transform.

It is a further object of the present invention to provide a data processing method and a data processing device which enable coding/decoding processing of a still picture or a moving picture with high performance using wavelet transform and inverse wavelet transform.

Thus, in the present invention, in dividing data of a finite length into a plurality of frequency bands so as to carry out data processing, it is discriminated whether an extrapolation processing method for convolution at both ends of data with respect to band division processing and corresponding band synthesis processing is appropriate or not, and band division processing is carried out using extrapolation processing discriminated as being appropriate.

Specifically, a data processing method according to the present invention is adapted for dividing data of a finite length into a plurality of frequency bands so as to carry out data processing, and includes the steps of discriminating whether an extrapolation processing method for convolution at both ends of data with respect to band division processing and corresponding band synthesis processing is appropriate or not, and carrying out band division processing using extrapolation processing discriminated as being appropriate.

A data processing device according to the present invention is adapted for dividing data of a finite length into a plurality of frequency bands so as to carry out data processing, and includes extrapolation processing discriminating means for discriminating whether an extrapolation processing method for convolution at both ends of data with respect to band division processing and corresponding band synthesis processing is appropriate or not, and band division processing means for using extrapolation processing discriminated as being appropriate.

In the data processing method and the data processing device according to the present invention, for example, subband transform or wavelet transform is carried out by the band division processing.

Also, in the data processing method and the data processing device according to the present invention, for example, it is discriminated whether an extrapolation processing method is appropriate or not with respect to characteristics of a filter used for wavelet transform and inverse wavelet transform and the length of a data array on which downsampling and wavelet transform are to be carried out.

Also, in the data processing method and the data processing device according to the present invention, for example, if an extrapolation processing method satisfies complete reconstruction conditions within a range of precision of a filter used for wavelet transform and inverse wavelet transform, the extrapolation processing method is regarded as being appropriate.

Also, in the data processing method and the data processing device according to the present invention, for example, an extrapolation processing method used by an analysis filter for wavelet transform is provided, and if the provided extrapolation processing method is inappropriate with respect to characteristics of the filter used and the length of a data array on which down-sampling and wavelet transform are to be carried out, the inappropriateness is notified of so as to suspend subsequent processing.

Also, in the data processing method and the data processing device according to the present invention, for example, if an extrapolation processing method provided from outside is inappropriate with respect to characteristics of a filter used for wavelet transform and inverse wavelet transform and the length of a data array on which down-sampling and wavelet transform are to be carried out, a preset extrapolation processing method is used for carrying out wavelet transform.

Also, in the data processing method and the data processing device according to the present invention, for example, wavelet transform is carried out by using, as an extrapolation processing method, any one of a zero-shift even function loopback method for loopback at a sample position at an end of a data array as the center of symmetry, a zero-shift odd function loopback method for loopback with an inverted sign at a sample position at an end of a data array as the center of symmetry, a half-shift even function loopback method for loopback on the outside for half-sample from an end sample position as the center of symmetry, and a half-shift odd function loopback method for loopback with an inverted sign on the outside for half-sample from an end sample position as the center of symmetry.

Also, in the data processing method and the data processing device according to the present invention, for example, if any one of the four loopback methods is used as an extrapolation processing method, and if symmetry at the end position of the data array is retained even after down-sampling in wavelet transform, the loopback method is regarded as being appropriate.

Also, in the data processing method and the data processing device according to the present invention, for example, if extrapolation data is insufficient by one loopback because the length of a filter used is great in comparison with the length of a data array, extrapolation processing is carried out so that a data array including extrapolation data with respect to a leading end position and a trailing end position of the data array has a periodicity with a basic cycle thereof being not more than twice the data length.

Also, in the data processing method and the data processing device according to the present invention, for example, in analysis filtering processing, from the number of taps of an analysis filter used for wavelet transform and the length of a data array, if extrapolation data is insufficient by one loopback because the length of the filter used is great in comparison with the length of the data array, and if a data array including the extrapolation data after down-sampling in wavelet transform has a periodicity with a cycle thereof being equal to a value found by dividing a basic cycle thereof by a sampling interval of down-sampling, a combination of loopback methods used at a leading end position and a trailing end position is regarded as being appropriate.

Also, in the data processing method and the data processing device according to the present invention, for example, extrapolation processing methods with respect to a leading end position and a trailing end position of a data array are selected from the four loopback methods, and whether the combination is appropriate or not is discriminated sequentially with respect to all possible combinations.

Also, in the data processing method and the data processing device according to the present invention, for example, if there exists no appropriate combination of loopback methods with respect to a leading end position and a trailing end position of a data array, with respect to the characteristics of the filter used for wavelet transform and the length of the data array on which down-sampling and wavelet transform are to be carried out, the nonexistence of appropriate combination is notified of so as to suspend subsequent processing.

Also, in the data processing method and the data processing device according to the present invention, for example, if there exists no appropriate combination of loopback methods with respect to a leading end position and a trailing end position of a data array, with respect to the characteristics of the filter used for wavelet transform and the length of the data array on which down-sampling and wavelet transform are to be carried out, a preset combination of loopback methods is used for carrying out wavelet transform.

Also, in the data processing method and the data processing device according to the present invention, for example, with respect to each of a leading end position and a trailing end position of a data array, any one of a zero-shift even function loopback method for loopback at a sample position at an end of a data array as the center of symmetry and a half-shift even function loopback method for loopback on the outside for half-sample from an end sample position as the center of symmetry is selected, and whether a combination of the selected loopback methods is appropriate or not is discriminated from the analysis filter used for wavelet transform and the length of the data array on which down-sampling and wavelet transform are to be carried out.

Also, in the data processing method and the data processing device according to the present invention, for example, with respect to a leading end position and a trailing end position of a data array, the phase shift quantity of a symmetrical center position due to a loopback method, filtering processing by an analysis filter and down-sampling is calculated. If the value of the trailing end position is 0 or ½ of a sampling interval used for down-sampling, and if the value of the leading end position is 0 or ½ of the sampling interval with a negative sign, the loopback method used is regarded as being appropriate, and a loopback method used for corresponding inverse wavelet transform is determined from the phase shift quantity, with respect to a combination of loopbacks at both ends discriminated as being appropriate.

Also, in the data processing method and the data processing device according to the present invention, for example, with respect to a leading end position and a trailing end position of a data array, the phase shift quantity of a symmetrical center position due to a loopback method, filtering processing by an analysis filter and down-sampling is calculated. If absolute values of the phase shift quantity at both ends are values integer times a sampling interval used for down-sampling or values odd-number times of ½ of the sampling interval, a value integer times the sampling interval is added to the value of the phase shift quantity, and an offset quantity necessary for obtaining a value not less than −½ and not more than 0 with respect to the leading end position and an offset quantity necessary for obtaining a value not less than 0 and not more than ½ with respect to the trailing end position are calculated. If the offset quantities with respect to the leading end position and the trailing end position coincide with each other, the offset value is transmitted to carry out phase shift of the offset quantity on a stage prior to down-sampling in wavelet transform. If the calculated offset quantities with respect to the leading end position and the trailing end position do not coincide with each other, the combination of selected loopback methods is discriminated as being inappropriate.

Also, in the data processing method and the data processing device according to the present invention, for example, from the number of taps of an analysis filter used for wavelet transform and the length of a data array, if extrapolation data is insufficient by one loopback because the length of the filter used is great in comparison with the length of the data array in analysis filtering processing or synthesis filtering processing, and only if a residue obtained by dividing a basic cycle by a sampling interval is 0, the combination of selected loopback methods is regarded as being appropriate, and a loopback method used for corresponding inverse wavelet transform is determined from the phase shift quantity.

Also, in the data processing method and the data processing device according to the present invention, for example, if a combination of loopback methods used at a leading end position and a trailing end position of a data array is discriminated as being appropriate, as a loopback method used for corresponding inverse wavelet transform, the zero-shift even function loopback method is employed when the value of the phase shift quantity is 0 while the analysis filter has an even function. The zero-shift odd function loopback method is employed when the value of the phase shift quantity is 0 while the analysis filter has an odd function. The half-shift even function loopback method is employed when the value of the phase shift quantity is a value ½ of the sampling interval with respect to the trailing end position of the data array and a value ½ of the sampling interval with a negative sign with respect to the leading end position while the analysis filter has an even function. The half-shift odd function loopback method is employed when the value of the phase shift quantity is a value ½ of the sampling interval with respect to the trailing end position and a value ½ of the sampling interval with a negative sign with respect to the leading end position while the analysis filter has an odd function.

Also, in the data processing method and the data processing device according to the present invention, for example, a signal obtained by dividing data of a finite length into a plurality of frequency bands is quantized and coded by using extrapolation processing discriminated as being appropriate.

Further, in the data processing method and the data processing device according to the present invention, for example, band synthesis processing is carried out using extrapolation processing discriminated as being appropriate with respect to a signal obtained by dividing data of a finite length into a plurality of frequency bands.

In addition, in the present invention, an appropriate extrapolation processing method is received with respect to data of a finite length divided into a plurality of frequency bands, and band synthesis processing is carried out by using the received extrapolation processing.

Specifically, a data processing method according to the present invention includes the steps of receiving an appropriate extrapolation method with respect to data of a finite length divided into a plurality of frequency bands, and carrying out band synthesis processing by using the received extrapolation processing.

A data processing device according to the present invention is adapted for synthesizing data of a finite length divided into a plurality of frequency bands, and includes extrapolation processing receiving means for receiving an appropriate extrapolation method, and band synthesis processing means for carrying out band synthesis processing by using the extrapolation processing received by the extrapolation processing receiving means.

Also, in the data processing method and the data processing device according to the present invention, for example, band synthesis of data of a finite length divided into frequency bands by wavelet transform is carried out using the received extrapolation processing, thereby carrying out inverse wavelet transform.

Also, in the data processing method and the data processing device according to the present invention, for example, coding of data of a finite length coded by dividing into a plurality of frequency bands is decoded, so as to carry out band synthesis processing using the received extrapolation processing.

BRIEF DESCRIPTION OF THE DRAWINGS

FIGS. 8A to 8D show four patterns of extrapolation processing in the first embodiment.

BEST MODE FOR CARRYING OUT THE INVENTION

Preferred embodiments of the present invention will now be described in detail with reference to the drawings.

Figure 1:
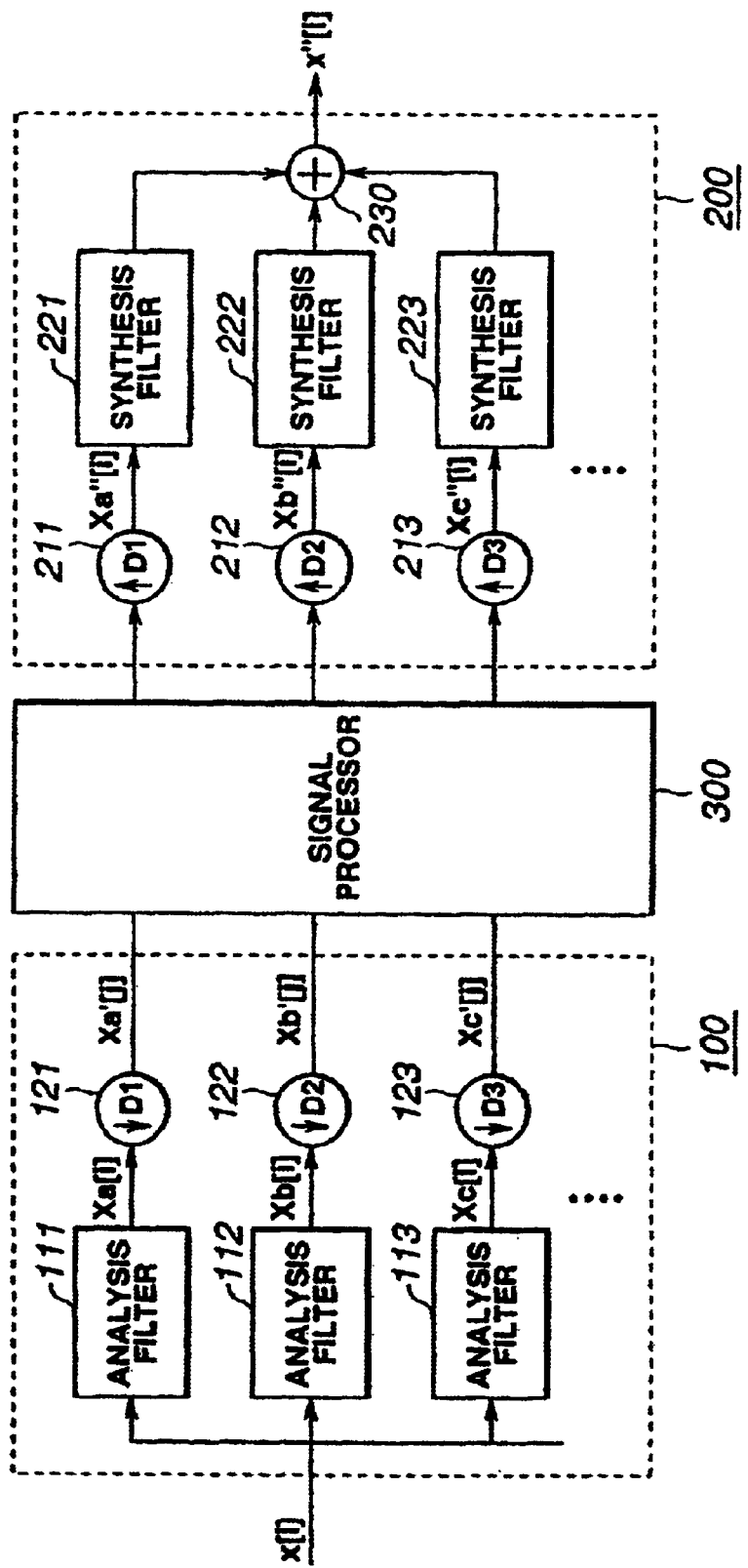
FIG. 1 is a block diagram showing the basic structure for band division and synthesis by wavelet transform and inverse wavelet transform.
Figure 7:
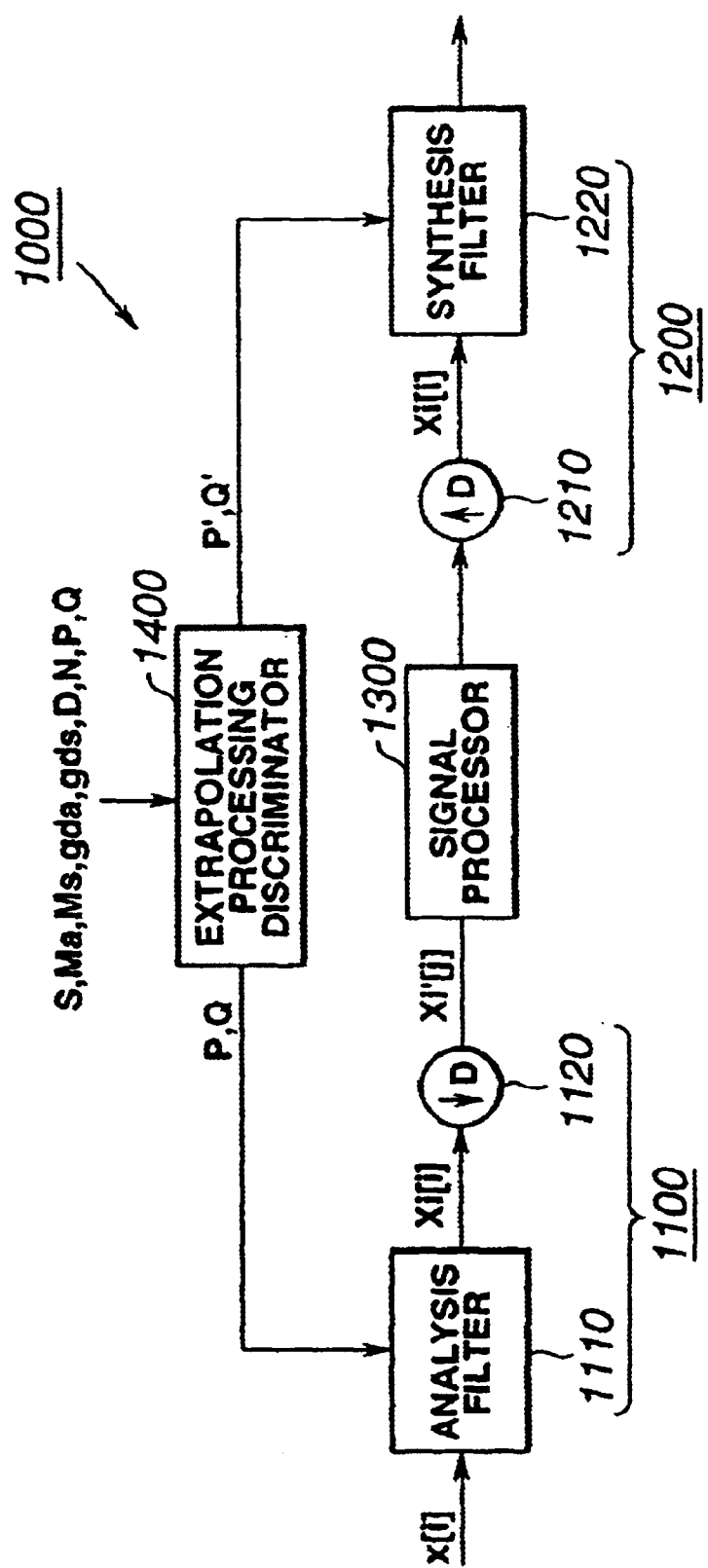
FIG. 7 is a block diagram showing the structure of essential portions of a first embodiment of the present invention.

In a first embodiment of the present invention shown in FIG. 7, the present invention is applied to the conventional data processing device of FIG. 1.

A data processing device 1000 of the first embodiment includes a wavelet transform unit 1100 for carrying out band division of an input signal x[i] into signals Xi[j] of a plurality of frequency bands (subbands), and an inverse wavelet transform unit 1200 for synthesizing the signals Xi[j] divided into a plurality of subbands so as to restore the input signal x[i]. The data processing device 1000 also includes a signal processor 1300 for carrying out quantization, variable length coding, transmission, variable length decoding, and inverse quantization on the signals Xi[j] divided into a plurality of subbands so as to supply the processed signals to the inverse wavelet transform unit 1200, and an extrapolation processing discriminator 1400 for discriminating whether an extrapolation method for convolution processing at both ends of data with respect to band division processing by the wavelet transform unit 1100 and corresponding band synthesis processing by the inverse wavelet transform unit 1200 is appropriate or not.

In the first embodiment, an analysis filter 1110 and a down-sampling unit 1120 of the wavelet transform unit 1100 correspond to the analysis filters 111, 112, 113 . . . and the down-sampling units 121, 122, 123 . . . , respectively. An up-sampling unit 1210 and a synthesis filter 1220 of the inverse wavelet transform unit 1200 correspond to the down-sampling units 211, 212, 213 . . . and the synthesis filters 221, 222, 223 . . . of the inverse wavelet transform unit 200 in the data processing device of FIG. 1, respectively.

In the wavelet transform unit 1100, the analysis filter 1110 carries out band division of the input signal x[i] into signals Xi[i] of a plurality of frequency bands (subbands). Then, the down-sampling unit 1120 carries out thinning for every one sample with respect to the signals Xi[i] of the individual frequency bands divided by the analysis filter 1110.

$$Xi[j]=Xi[i],j=i/2 \qquad \text{Equation (13)}$$

In the inverse wavelet transform unit 1200, first, the up-sampling unit 1210 extends the sampling interval twice with respect to the signals Xi[j] divided into a plurality of subbands by the wavelet transform unit 1100, and inserts a sampling having a zero value to a center position thereof. Then, the signals Xi[i] of the individual frequency bands obtained on up-sampling by the up-sampling unit 1210 are processed by synthesis filter interpolation corresponding to the analysis filter 1110, and added and synthesized by an adder, not shown. Thus, the input signal x[i] is restored.

Before filtering processing by the analysis filter 1110 starts, the extrapolation processing discriminator 1400 discriminates whether or not extrapolation processing satisfies complete reconstruction conditions, on the basis of the symmetry (whether an odd function or an even function) S, the number of taps Ma and the group delay gda of the analysis filter used for processing of the subband, the number of taps Ms and the group delay gds of the synthesis filter, the sampling interval D of down-sampling, the number of samples N of data to be processed, and an extrapolation processing method P with respect to a leading end position and an extrapolation processing method Q with respect to a trailing end position which are designated from outside. Various parameters necessary for the above-described discrimination are provided through a register, not shown.

For extrapolation processing, four loopback methods as shown in FIGS. 8A, 8B, 8C and 8D may be considered. Specifically, in a zero-shift even function loopback method (ZE) shown in FIG. 8A, loopback is made at an end position of an input data array as the center of symmetry. In a zero-shift odd function loopback method (ZO) shown in FIG. 8b, if data at an end position is zero, loopback is made at that position as the center of symmetry, and the sign is inverted. In a half-shift even function loopback method (HE) shown in FIG. 8C, loopback is made at a position on the outside for half-sample from data at an end position as the center of symmetry. In a half-shift odd function loopback method (HO) shown in FIG. 8D, loopback is made at that position as the center, and the sign is inverted. However, as a method used for wavelet transform, the zero-shift even function loopback method (ZE) or the half-shift even function loopback method (HE) is used in order to avoid discontinuity at the end position of the data array.

Figure 9:
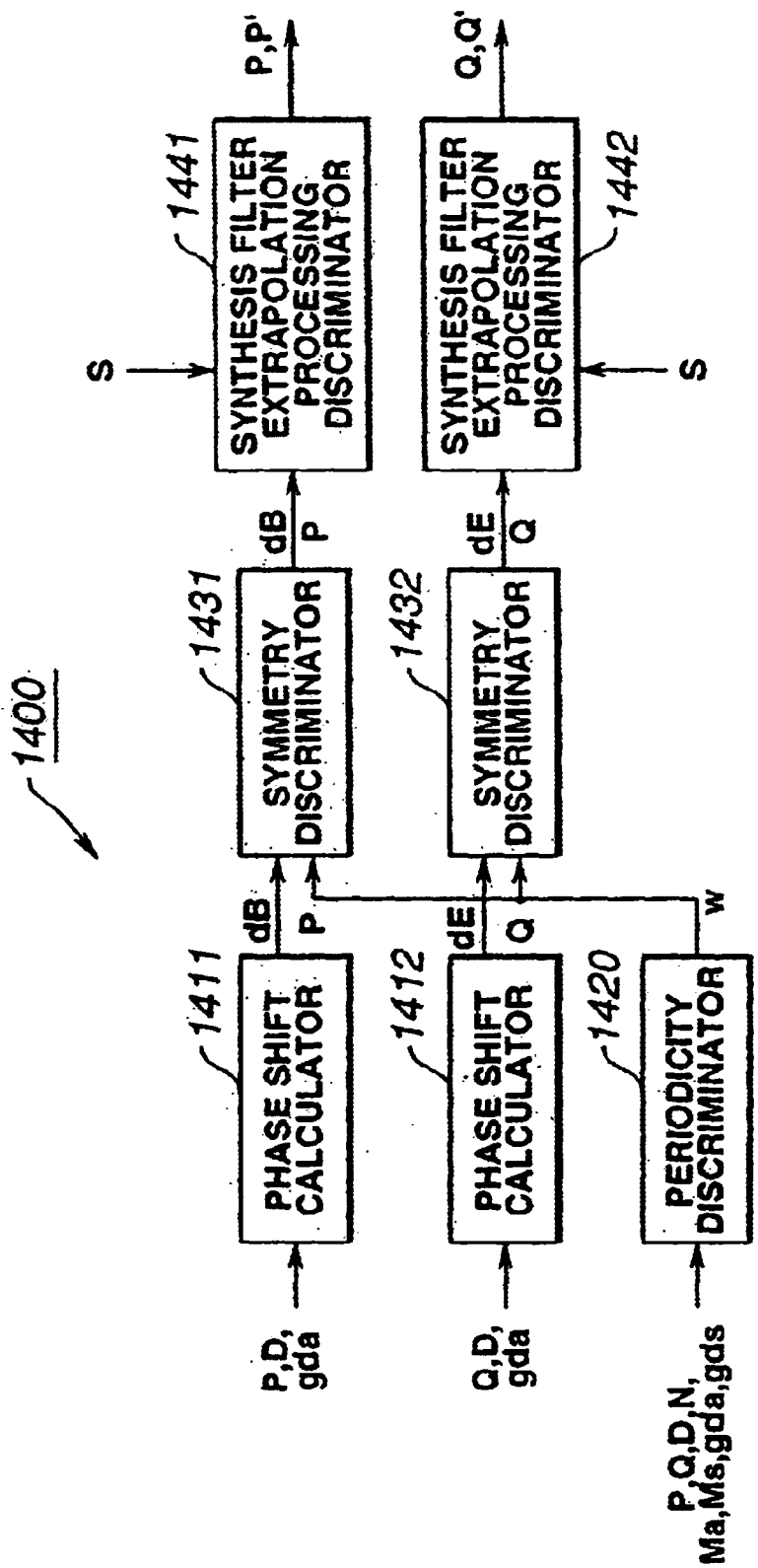
FIG. 9 is a block diagram showing the structure of an extrapolation processing discriminator in the first embodiment.
Figure 10A:
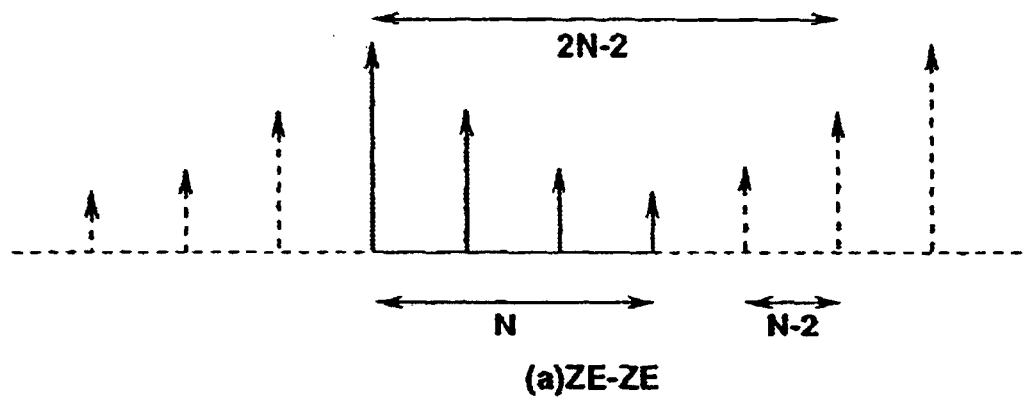
FIGS. 10A to 10D show basic cycles using a combination of a zero-shift even function loopback method and a half-shift even function loopback method.
Figure 10B:
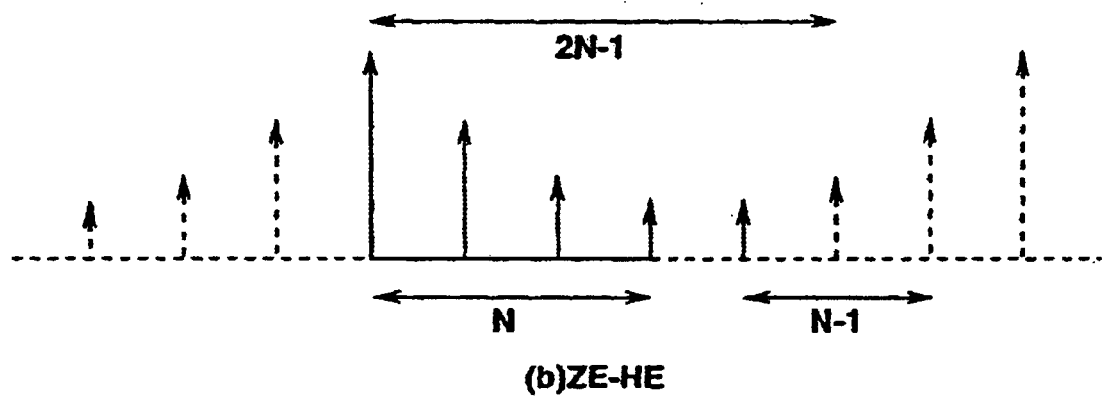
Figure 10C:
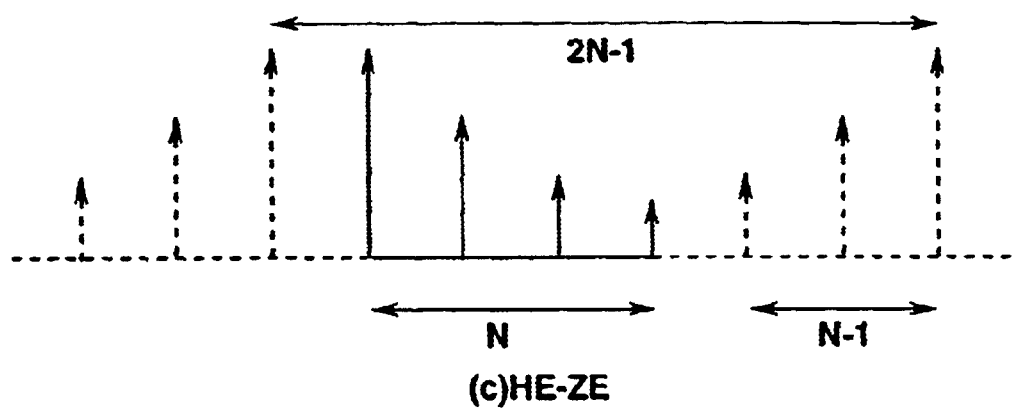
Figure 10D:
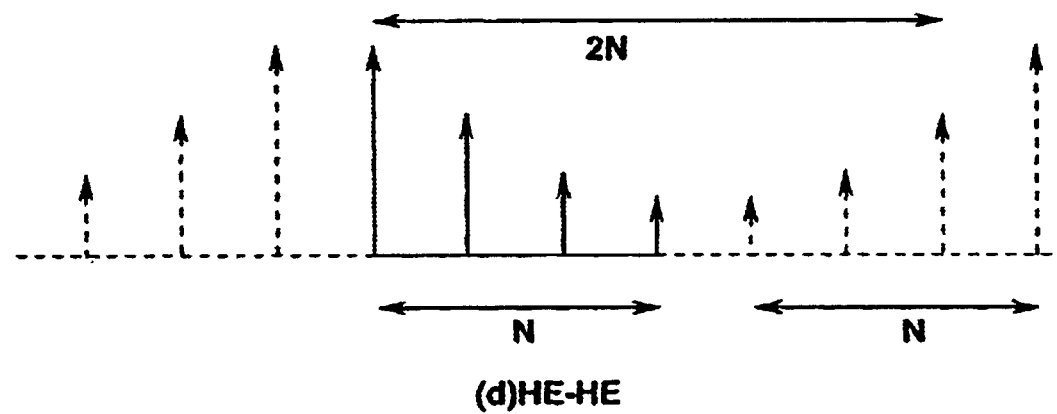

FIG. 9 shows the structure of the extrapolation processing discriminator 1400. Two phase shift calculators 1411, 1412 correspond to the leading end position and the trailing end position of the data array, respectively, and calculate phase shift quantities dB, dE at the symmetrical center position generated by loopback processing, filtering processing by the analysis filter 1110 and down-sampling, using the following Equations (14), (15).

$$dB=dP+dF-dDB \qquad \text{Equation (14)}$$

$$dE=dQ+dF+dDE \qquad \text{Equation (15)}$$

In the Equations, dP, dQ represent the phase shift quantities due to loopback and take values as shown in the following Table 2 with respect to each loopback method.

TABLE 2

Phase Shift Quantity Due to Loopback

| Loopback Method | Leading End Position | Trailing End Position |
|---|---|---|
| Zero-Shift Even Function | 0 | 0 |
| Half-Shift Even Function | −0.5 | +0.5 |

Also, dga represents the group delay quantity of the analysis filter, and becomes an integer value (sample unit) in the case where the number of taps of the filter is an odd number, and an integer +0.5 in the case where the number of taps of the filter is an even number. dDB, dDE represent phase shift quantities due to down-sampling at the leading end position and the trailing end position, and are determined by the sampling interval D of down-sampling and the number of samples N of the input data array. In normal down-sampling, since sampling is carried out so that the leading data remains, dDB=0, and dDE is determined by the following Equation (16).

$$dDE=mod((N-1)/D) \qquad \text{Equation (16)}$$

In the Equation (16), mod represents a function for returning a residue of division. The calculated phase shift quantities dB, dE are transmitted together with the designated loopback methods P, Q to corresponding symmetry discriminators 1431, 1432.

A periodicity discriminator 1420 first discriminates whether or not necessary extrapolation data may be obtained by one loopback at the end of the data array, from the number of taps Ma of the analysis filter 1110, the number of taps Ms of the synthesis filter and the length N of the data array, by using the following Equations (17), (18), (19) and (20).

$$N' >= Ma'$$
$$N'' >= Ms'$$
Equation (17)

$$N' = \begin{cases} N & \ldots P = HE \text{ or } HO \\ N-1 & \ldots P = ZE \text{ or } ZO \end{cases}$$
Equation (18)

$$N'' = \begin{cases} (N/D)D & \ldots Q = HE \text{ or } HO \\ (N/D-1)D & \ldots Q = ZE \text{ or } ZO \end{cases}$$
Equation (19)

$$Mp' = \begin{cases} Mp/2 + gdp & \ldots Mp: \text{ even number} \\ (Mp-1)/2 + gdp & \ldots Mp: \text{ odd number} \end{cases}$$
Equation (20)

In the division of Equation (19), decimal fractions are rounded down. Mp represents Ma or Ms, and gdp represents gda or gds. If Ma', Ms' satisfy Equation (13) both at the leading end position and the trailing end position of the data array, necessary extrapolation data is obtained by one loopback and the condition of periodicity becomes unnecessary. Therefore, a signal of w=0 is transmitted to the symmetry discriminators 1430.

Otherwise, a residue w obtained by dividing the basic cycle T determined by the combination of loopback methods P, Q at both ends by the sampling interval D of downsampling is calculated by the following Equation (21), and transmitted to the symmetry discriminators 1430.

$$w = mod(T/D)$$
Equation (21)

The basic cycle T is the length of one cycle of a periodic data array generated by using loopback processing designated at the leading end position and the trailing end position of the data array, and takes values as shown in Table 3 with respect to the individual combinations of loopback methods, as shown in FIGS. 10A, 10B, 10C and 10D.

TABLE 3

Basic Cycle by Combination of Loopback Methods

| Leading End Position | Trailing End Position | Basic Cycle |
|---|---|---|
| Zero-Shift Even Function | Zero-Shift Even Function | 2N-2 |
| Zero-Shift Even Function | Half-Shift Even Function | 2N-1 |
| Half-Shift Even Function | Zero-Shift Even Function | 2N-1 |
| Half-Shift Even Function | Half-Shift Even Function | 2N |

(N: number of samples of data array; unit: sample)

The analysis filter 1110 and the synthesis filter 1220 in the first embodiment carry out extrapolation processing so as to execute filtering in accordance with the procedure shown in the flowchart of FIG. 11 by using the extrapolation methods P, Q, P' and Q' which are discriminated as being appropriate by the extrapolation processing discriminator 1400 as later described.

At this point, in the synthesis filter 1220, a designated loopback method is applied to a data array prior to insertion of a zero value by the up-sampling unit 1210. Specifically, if the position of data to be extrapolated corresponds to the position where a zero value is to be inserted by the up-sampling unit 1210, the value is constantly zero. At the other extrapolation positions, a loopback rule is applied while ignoring the position where a zero value is inserted by the up-sampling unit 1210, and the value of extrapolation data is found.

Figure 11:
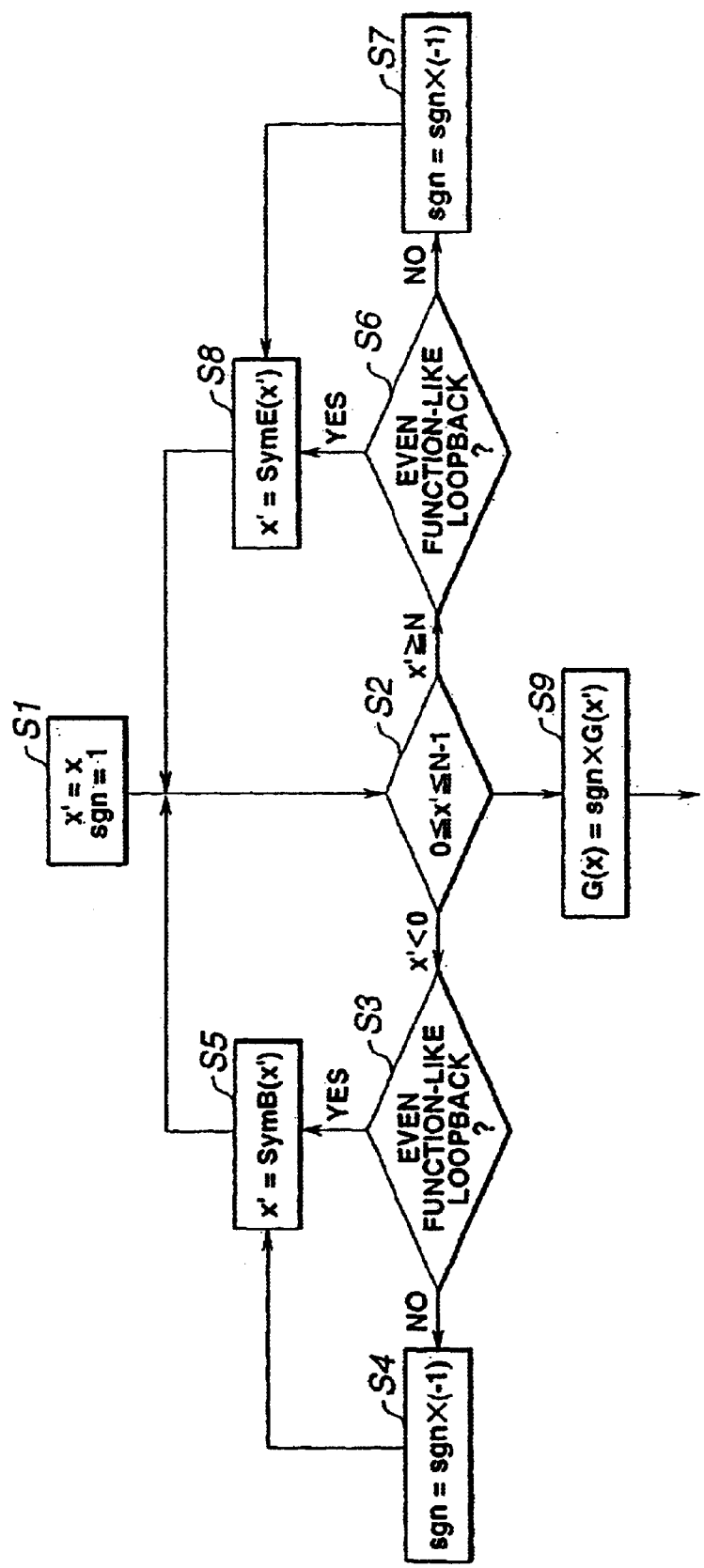
FIG. 11 is a flowchart for explaining a method for generating a periodic data array having a basic cycle.

In extrapolation processing shown in the flowchart of FIG. 11, x is an index expressing the position on the data array, and indices 0 to (N−1) are allocated with respect to N units of input data. This extrapolation processing is equivalent to processing for finding a data value with respect to a position such that x does not exist within this range by loopback.

At the first step S1, a variable x' and a variable sgn are initialized (x'=x, sgn=1).

At the subsequent step S2, it is discriminated whether or not the variable x' is not less than 0 and not more than (N−1). If it is discriminated at step S2 that x'≧N, that is, the variable x' is not less than N, the operation proceeds to step S3. If it is discriminated that x'<0, that is, the variable x' is less than 0, the operation proceeds to step S6. If the result of discrimination is YES, that is, if it is discriminated that the variable x' is not less than 0 and not more than (N−1), the operation proceeds to step S9.

At step S3, it is discriminated whether the discriminated extrapolation processing method is the even function loopback method or not. If the result of discrimination at step S3 is NO, that is, if the method is not the even function loopback method, the operation proceeds to step S4. If the result of discrimination is YES, that is, if the method is the even function loopback method, the operation proceeds to step S5. At step S4, the variable sgn is set to sgn=sgn×(−1) so as to invert the sign of the variable sgn, and the operation proceeds to step S5. At step S5, the variable x' is set to x'=SymB(x'), and the operation returns to step S2.

At step S6, it is discriminated whether the filter used is for even function loopback or not. If the result of discrimination at step S6 is NO, that is, if the filter used is not for even function loopback, the operation proceeds to step S7. If the result of discrimination is YES, that is, if the filter used is for even function loopback, the operation proceeds to step S8. At step S7, the variable sgn is set to sgn=sgn×(−1) so as to invert the sign of the variable sgn, and the operation proceeds to step S8. At step S8, the variable x' is set to x'=SymE(x'), and the operation returns to step S2.

SymB(x') represents a position corresponding to x obtained by a loopback method with respect to the leading end of the data array, and SymE(x') represents a position corresponding to x obtained by a loopback method with respect to the trailing end.

Then, at step S9, a data value G(x) at the position x is set to G(x)=sgn×G(x').

In actually carrying out filtering processing by the analysis filter 1110 and the synthesis filter 1210, if extrapolation data required fro one loopback cannot be obtained at the end position of the data array, periodical loopback is carried out on the basis of the flowchart of FIG. 11.

The two symmetry discriminators 1431, 1432 correspond to the leading end position and the trailing end position of the data array, respectively. If the value w transmitted from the periodicity discriminator 1420 is 0, and if the phase shift quantity dB transmitted from the phase shift calculator 1411 with respect to the leading end position is 0 or −D/2 while the phase shift quantity dE transmitted from the phase shift calculator 1412 with respect to the trailing end position is 0 or D/2, the symmetry discriminators 1431, 1432 transmit the shift quantity and the loopback method to synthesis filter extrapolation processing discriminators 1441, 1442. Otherwise, a signal indicating that the designated loopback method is appropriate is outputted so as to stop all the processing at that point. D represents the sampling interval in down-sampling.

The two synthesis filter extrapolation processing discriminators 1441, 1442 correspond to the leading end position and the trailing end position of the data array, respectively. The two synthesis filter extrapolation processing discriminators 1441, 1442 notify the analysis filter 1110 of loopback methods P, Q with respect to the analysis filter transmitted from the symmetry discriminators 1431, 1432. At the same time, the two synthesis filter extrapolation processing discriminators 1441, 1442 discriminate appropriate loopback methods P', Q' from the phase shift quantities dP, dQ transmitted similarly from the symmetry discriminators 1431, 1432, and transmit the discriminated loopback methods P', Q' to the synthesis filter 1220. At this point, in the case where the analysis filter 1110 has an even function, the zero-shift even function loopback method is notified of as the extrapolation method for the synthesis filter to the synthesis filter 1220 if the absolute value of the phase shift quantity is 0, while the half-shift even function loopback method is notified of to the synthesis filter 1220 if the absolute value of the phase shift quantity is D/2, as shown in Table 4. On the other hand, in the case where the analysis filter 1110 has an odd function, the zero-shift odd function loopback method is notified of as the extrapolation method for the synthesis filter to the synthesis filter 1220 if the absolute value of the phase shift quantity is 0, while the half-shift odd function loopback method is notified of to the synthesis filter 1220 if the absolute value of the phase shift quantity is D/2.

TABLE 4

Loopback Method for Synthesis Filter

| Symmetry of Analysis Filter | Absolute Value of Phase Shift Quantity | Loopback Method with Respect to Synthesis Filter |
|---|---|---|
| Even Function | 0 | Zero-Shift Even Function Loopback Method |
|  | D/2 | Half-Shift Even Function Loopback Method |
| Odd Function | 0 | Zero-Shift Odd Function Loopback Method |
|  | D/2 | Half-Shift Odd Function Loopback Method |

If the symmetry discriminators 1431, 1432 discriminate that the designated loopback methods P, Q with respect to the analysis filter are inappropriate, preset default loopback methods may be sent to the synthesis filter extrapolation processing discriminators 1441, 1442 so as to continue processing, instead of stopping all the processing.

In wavelet transform, the processing for further dividing each subband into a plurality of subbands may be repeated, as explained in the conventional example. In this case, too, the extrapolation method may be similarly discriminated with respect to each subband.

The processing by the extrapolation processing discriminator 1400 in the first embodiment may be carried out as follows.

That is, instead of inputting the extrapolation processing method to the extrapolation processing discriminator 1400 from outside, combinations (ZE, ZE), (ZE, HE), (HE, ZE) and (HE, HE) of the zero-shift even function loopback method (ZE) and the half-shift even function loopback method (HE) are sequentially generated, and the possibility as the extrapolation processing method at the leading end position and the trailing end position of the data array is sequentially verified. At the point when an appropriate combination of loopback methods is detected, the extrapolation processing method with respect to the synthesis filter is determined, and the loopback methods with respect to the analysis filter 1110 and the synthesis filter 1220 are notified of. If all the combinations are discriminated as being inappropriate, all the processing is stopped similarly to the first embodiment, or preset default loopback methods are notified of to the analysis filter 1110 and the synthesis filter 1220 so as to continue processing.

In the above-described first embodiment, the number of data samples, the number of subbands divided by wavelet transform, and the sampling interval in down-sampling are limited. For example, the phase shift quantity at the symmetrical center position, in the case where the number of data samples is limited to an even number while the number of subbands and the sampling interval are limited to 2, is indicated. The limitation in this case is not special but is equivalent to the conditions frequently used for actual coding of a picture.

The phase shift quantity at the symmetrical center position corresponding to the conditions in this case is shown in Table 5.

TABLE 5

| | Conditions | | | Phase Shift | | |
|---|---|---|---|---|---|---|
| Number of Taps of Filter | Symmetry of Filter | Leading End/ Trailing End | Loopback Method for Analysis | Group Delay of Filter | Loopback | Down-Sampling | Total |
| Odd Number | Even, Function (Low-Pass, High-Pass) | Leading End | ZE | i | 0 | 0 | i |
|  |  | Leading End | HE | i | −0.5 | 0 | i − 0.5 |
|  |  | Trailing End | ZE | i | 0 | 1 | i + 1 |
|  |  | Trailing End | HE | i | +0.5 | 1 | i + 1.5 |

TABLE 5-continued

| | | Conditions | | Phase Shift | | | |
|---|---|---|---|---|---|---|---|
| Number of Taps of Filter | Symmetry of Filter | Leading End/ Trailing End | Loopback Method for Analysis | Group Delay of Filter | Loopback | Down-Sampling | Total |
| Even Number | Even Function (Low-Pass)/ | Leading End | ZE HE | i + 0.5 i + 0.5 | 0 −0.5 | 0 0 | i + 0.5 i |
| | Odd Function (High-Pass) | Trailing End | ZE HE | i + 0.5 i + 0.5 | 0 +0.5 | 1 1 | i + 1.5 i + 2 | i integer value

In this case, to obtain appropriate loopback with respect to the analysis filter, the phase shift quantity at the symmetrical center position must be 0 or −D/2=−1 at the leading end position of the data array and 0 or D/2=1 at the trailing end position. As is clear from Table 5, the phase shift quantity has an integer value only when the combination of the zero-shift even function loopback method (ZE) both at the leading end position and the trailing end position is provided in the case where the number of taps of the filter is an odd number, or only when the combination of the half-shift even function loopback method (HE) both the leading end position and the trailing end position is provided in the case where the number of taps is an even number. However, for these combinations to be appropriate loopbacks, the phase shift quantity which is actually calculated by using group delay of the filter must be 0 or −D/2=−1 at the leading end position and 0 or D/2=1 at the trailing end position. Also, the loopback method for the corresponding synthesis filter depends on the actually calculated phase shift quantity and the symmetry of the filter.

If the same loopback method for the analysis filter is used at the leading end position and the trailing end position as described above, the basic cycle T is 2N−2 (where N represents the number of samples) with respect to the combination (ZE, ZE), and is 2N with respect to the combination (HE, HE), as seen from Table 3. In both cases, since the basic cycle can be divided by the sampling interval D=2, the condition of periodicity may be constantly satisfied.

In the case of such division into two subbands, the analysis filter 1110 becomes a low-pass filter and a high-pass filter. Since both of these low-pass filter and high-pass filter have an even function in the case where the number of taps is an odd number, extrapolation processing by the synthesis filter 1220 is an even function-like loopback method with respect to both the low-pass filter and the high-pass filter. On the other hand, in the case where the number of taps is an even number, since the low-pass filter has an even function while the high-pass filter has an odd function, extrapolation processing by the synthesis filter is an even function-like loopback method for the low-pass filter and an odd function-like loopback method for the high-pass filter.

A second embodiment of the present invention will now be described with reference to FIGS. 12 and 13.

Figure 12:
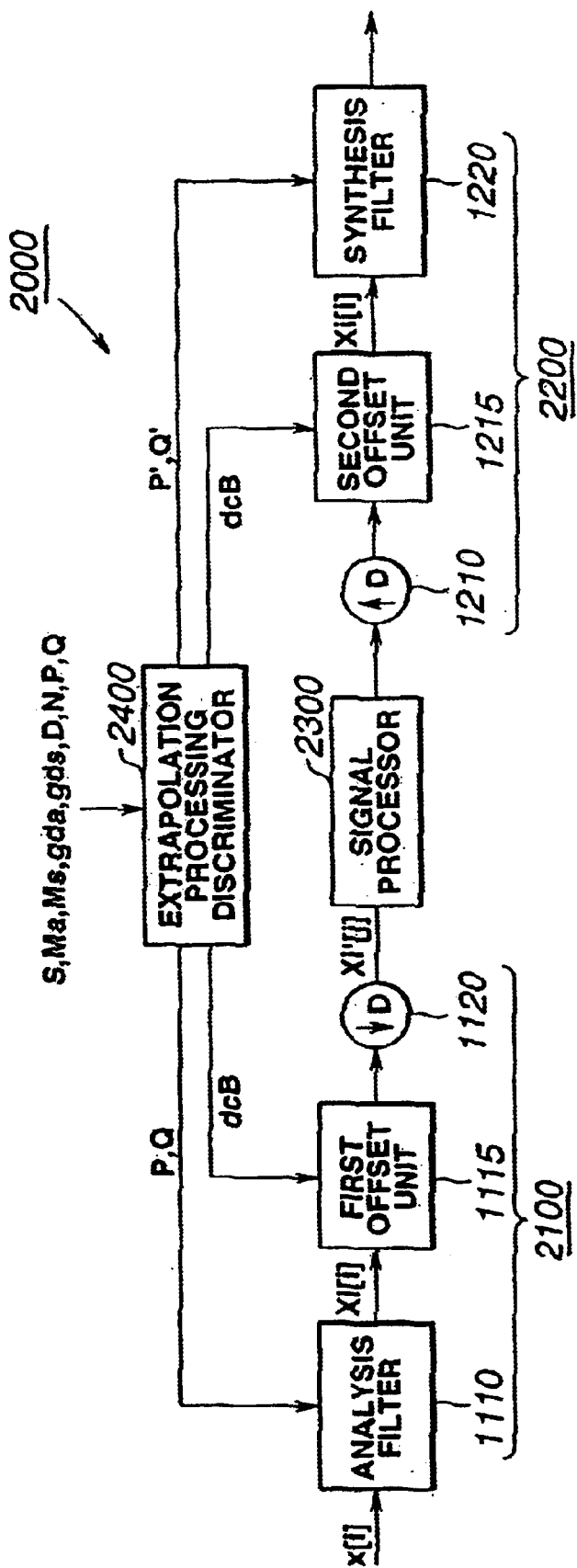
FIG. 12 is a block diagram showing the structure of essential portions of a second embodiment of the present invention.
Figure 13:
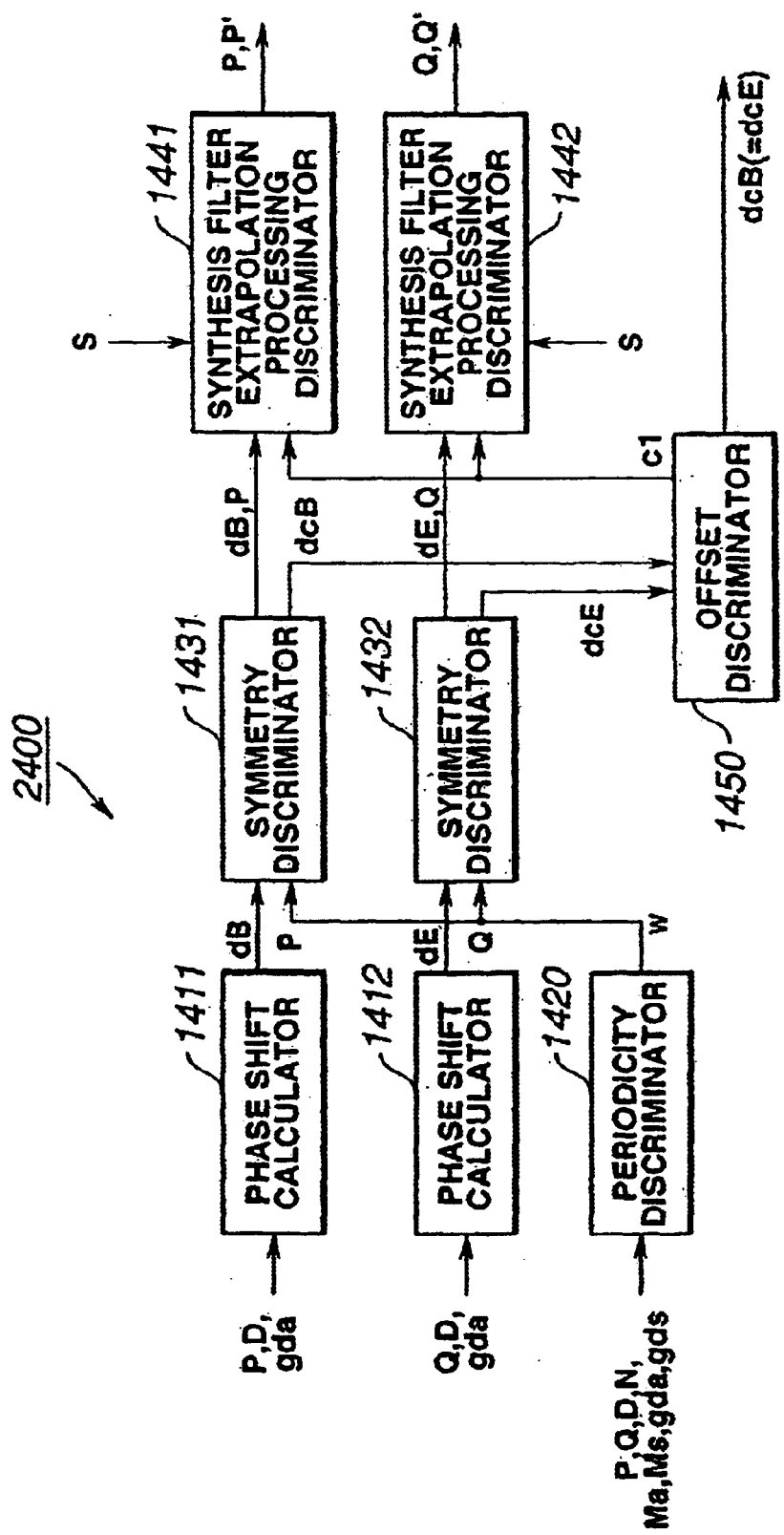
FIG. 13 is a block diagram showing the structure of an extrapolation processing discriminator in the second embodiment.

A data processing device 2000 of the second embodiment shown in FIG. 12 has a structure similar to that of the data processing device 1000 of the first embodiment as a whole, but differs in the structure for processing each subband and the structure of an extrapolation processing discriminator 2400 shown in FIG. 13. In the second embodiment, the same elements as in the data processing device 1000 of the first embodiment are denoted by the same numerals in FIGS. 12 and 13 and will not be described further in detail.

The data processing device 2000 in the second embodiment includes a wavelet transform unit 2100 for carrying out band division of an input signal x[i] into signals Xi[j] of a plurality of frequency bands (subbands), and an inverse wavelet transform unit 2200 for synthesizing the signals Xi[j] divided into a plurality of subbands so as to restore the input signal x[i]. The data processing device 2000 also includes a signal processor 2300 for carrying out quantization, variable length coding, transmission, variable length decoding, and inverse quantization on the signals Xi[j] divided into a plurality of subbands so as to supply the processed signals to the inverse wavelet transform unit 2200, and an extrapolation processing discriminator 2400 for discriminating whether an extrapolation method for convolution processing at both ends of data with respect to band division processing by the wavelet transform unit 2100 and corresponding band synthesis processing by the inverse wavelet transform unit 2200 is appropriate or not.

In the wavelet transform unit 2100, a first offset unit 1115 is installed between an analysis filter 1110 and a down-sampling unit 1120. In the inverse wavelet transform unit 2200, a second offset unit 1215 is installed between an up-sampling unit 1210 and a synthesis filter 1220.

The first and second offset units 1115, 1215 are provided with an offset quantity dcB (=dcE) from an offset discriminator 1450 provided in the extrapolation processing discriminator 2400, as shown in FIG. 13.

In this data processing device 2000, the extrapolation processing discriminator 2400 includes the offset discriminator 1450 which is connected with symmetry discriminators 1431, 1432 and with synthesis filter extrapolation processing discriminators 1441, 1442, as shown in FIG. 13.

If the value w transmitted from a periodicity discriminator 1420 is 0, and if the absolute values of phase shift quantities dP, dQ transmitted from phase shift calculators 1411, 1412 values integer times the sampling cycle D or ½ of the sampling cycle D, that is, a value odd-number times D/2, the symmetry discriminators 1431, 1432 add a value integer times the sampling interval D to the phase shift quantities, and calculate addition quantities necessary for obtaining a value not less than −½ and not more than 0 with respect to the leading end position of a data array and a value not less than 0 and not more than ½ with respect to the trailing end position. The symmetry discriminators 1431, 1432 transmit the calculated addition quantities as the offset quantities dcB, dcE to the offset discriminator 1450, and transmit loopback method P or Q used by the analysis filter 1110 to the synthesis filter extrapolation processing discriminators 1441, 1442.

The offset discriminator 1450 compares the offset quantities transmitted from the symmetry discriminators 1431, 1432 corresponding to the leading end position and the trailing end position. If the offset quantities coincide with each other, the offset discriminator 1450 transmits a signal cI indicating the coincidence to the synthesis filter extrapolation processing discriminators 1441, 1442, and transmits the offset quantity dcB (=dcE) to the first offset unit 1115 and the second offset unit 1215. If the offset quantities do not coincide with each other, the offset discriminator 1450 outputs a signal indicating the non-coincidence so as to stop all the processing at that point.

Then, in the wavelet transform unit 2100, data filtered by the analysis filter 1110 is shifted by the first offset unit 1115 by the offset quantity transmitted from the offset discriminator 1450, and is then down-sampled by the down-sampling unit 1120.

In the inverse wavelet transform unit 2200, data up-sampled by the up-sampling unit 1210 is shifted by the second offset unit 1215 in the inverse direction by the shift quantity transmitted from the offset discriminator 1450, and is then filtered by the synthesis filter 1220.

A third embodiment of the present invention will now be described.

Figure 2:
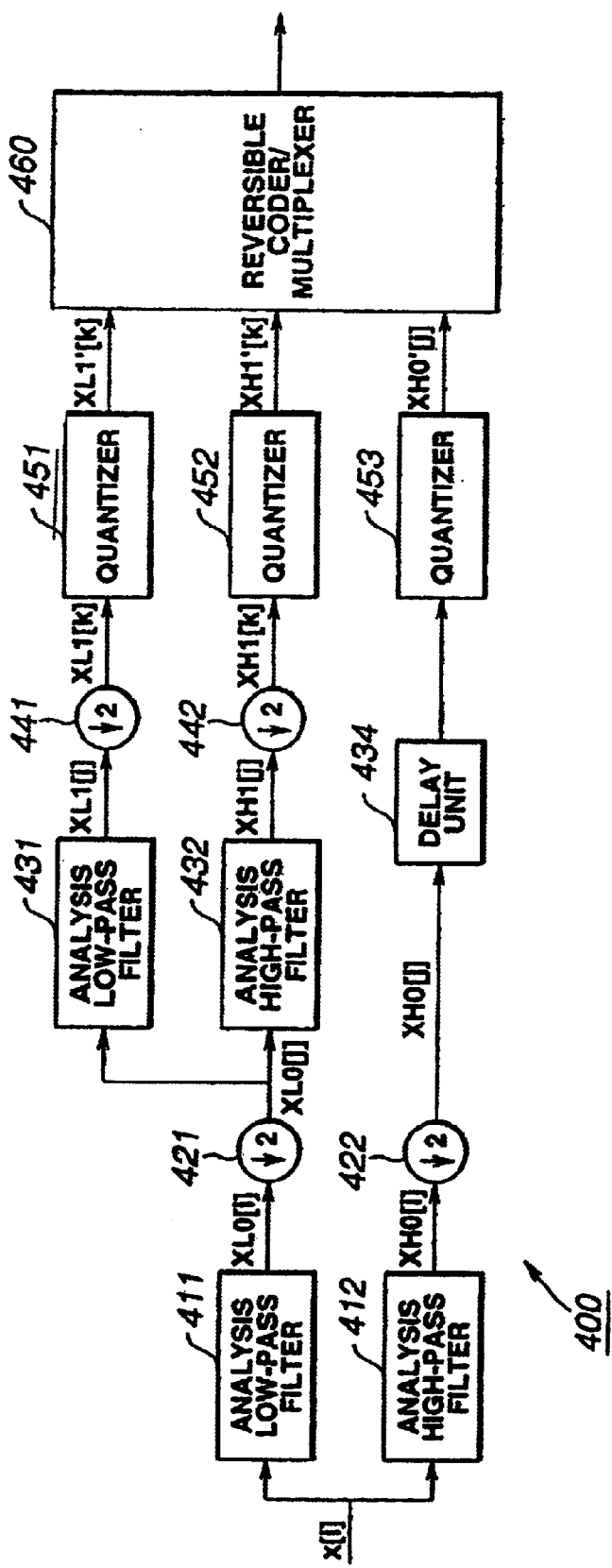
FIG. 2 is a block diagram showing the structure of an encoding device in a conventional one-dimensional encoding/decoding device using wavelet transform.
Figure 3:
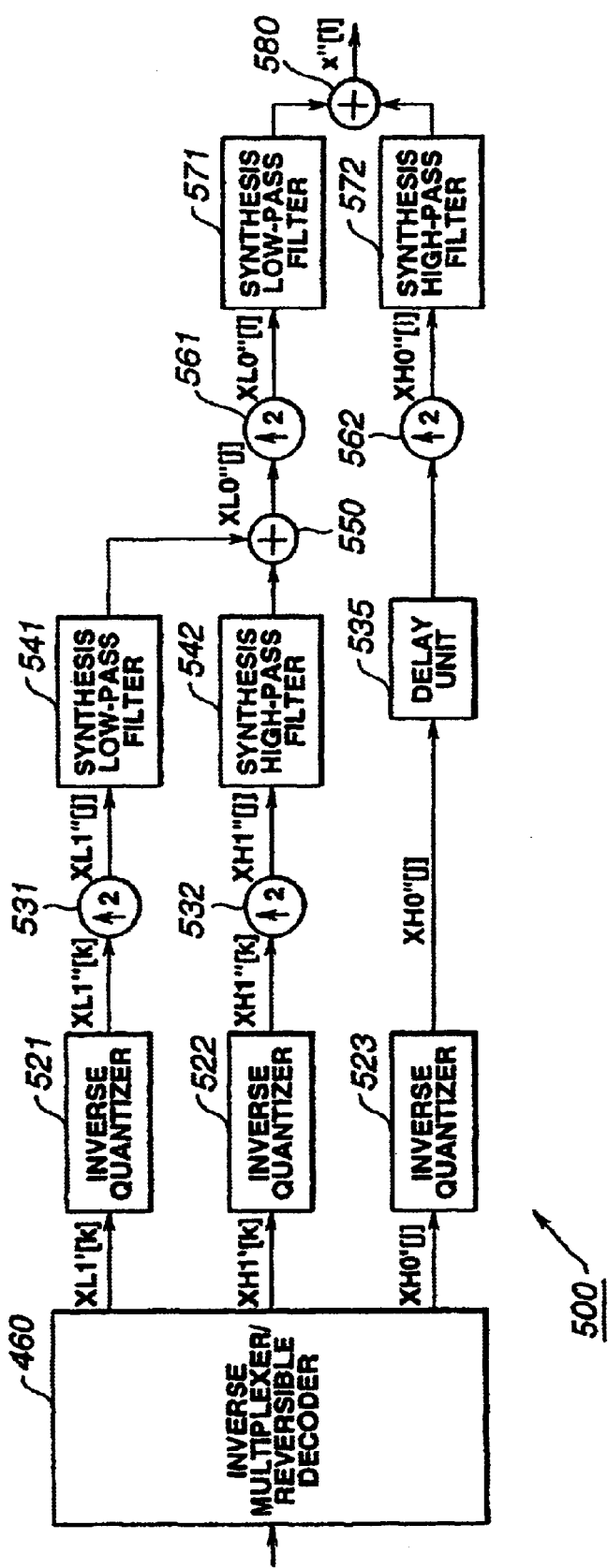
FIG. 3 is a block diagram showing the structure of a decoding device in the one-dimensional encoding/decoding device.
Figure 4:
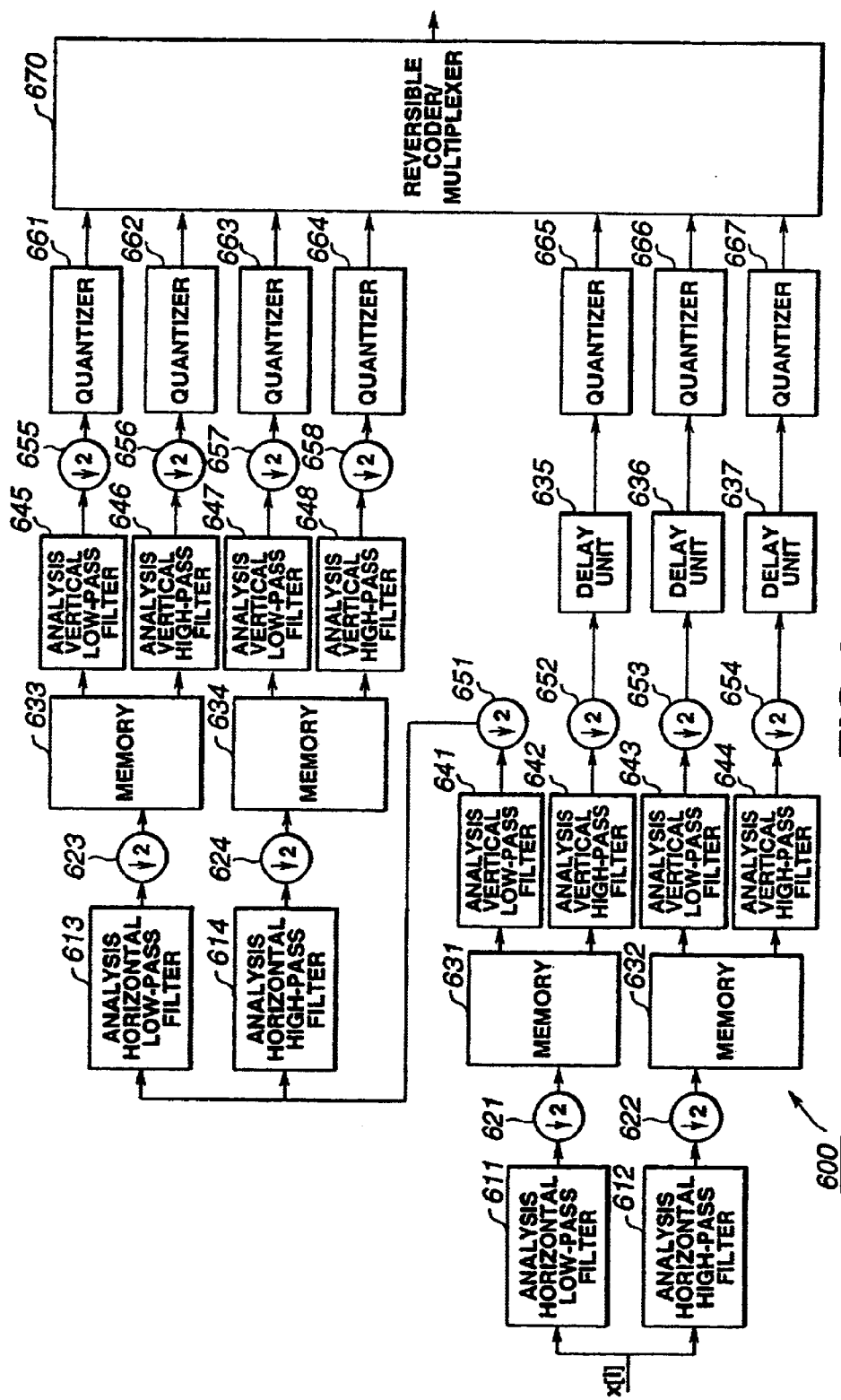
FIG. 4 is a block diagram showing the structure of an encoding device in a conventional two-dimensional data encoding/decoding device using wavelet transform.
Figure 5:
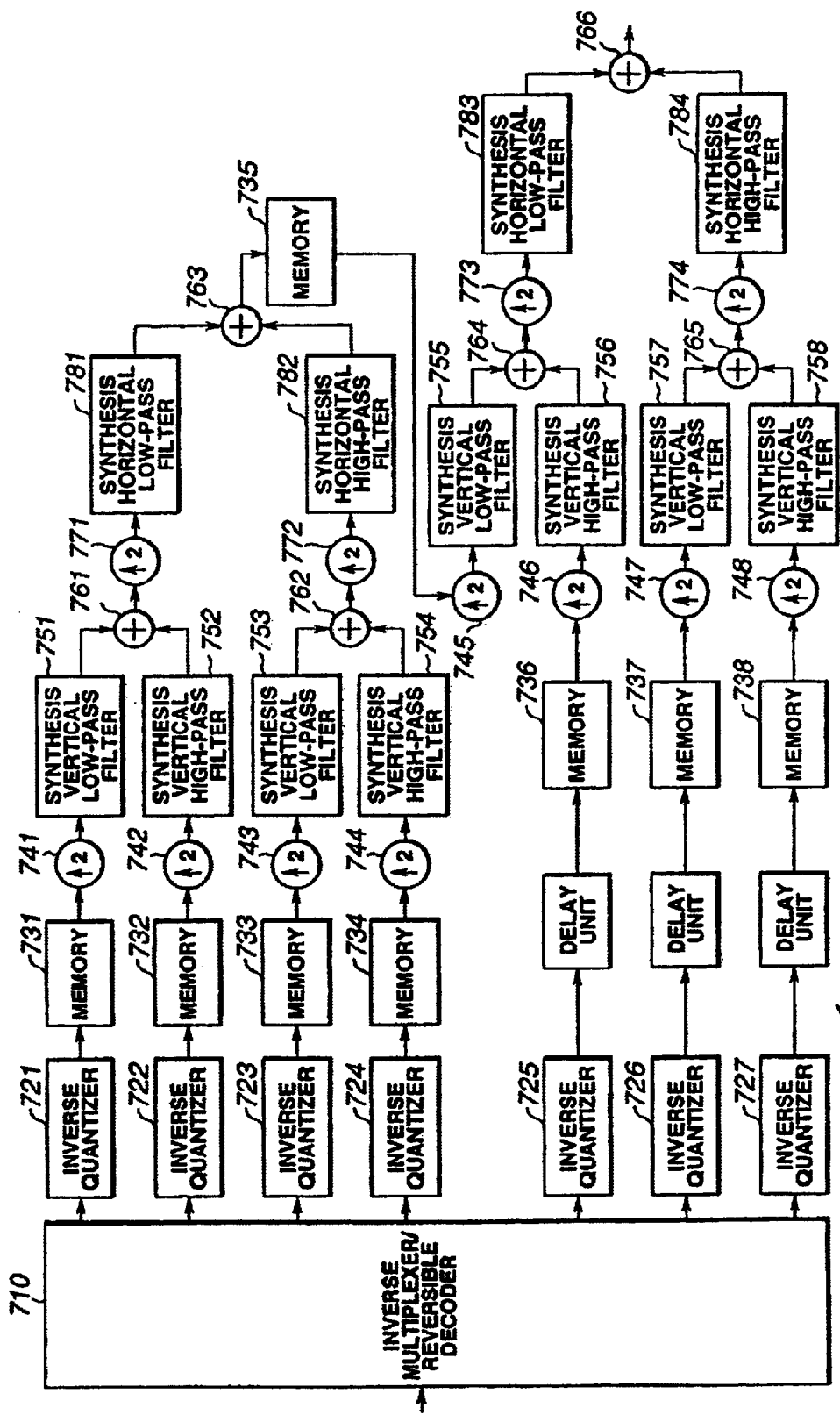
FIG. 5 is a block diagram showing the structure of a decoding device in the two-dimensional data encoding/decoding device.
Figure 6:
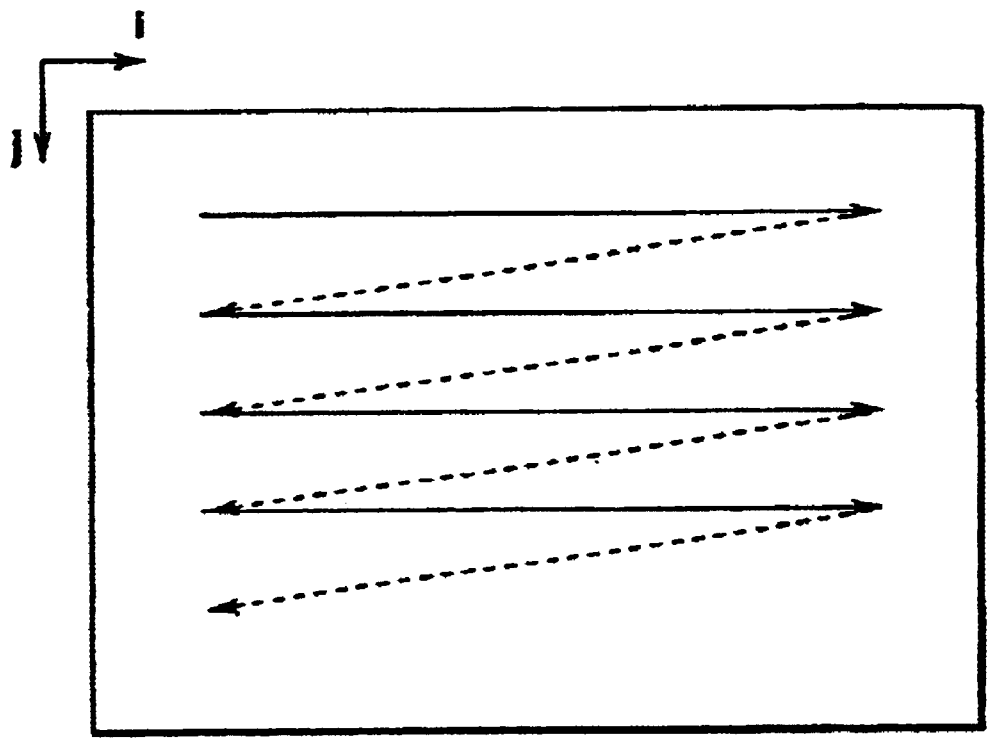
FIG. 6 is a block diagram showing a scanning direction of a picture in the two-dimensional data encoding/decoding device.
Figure 14:
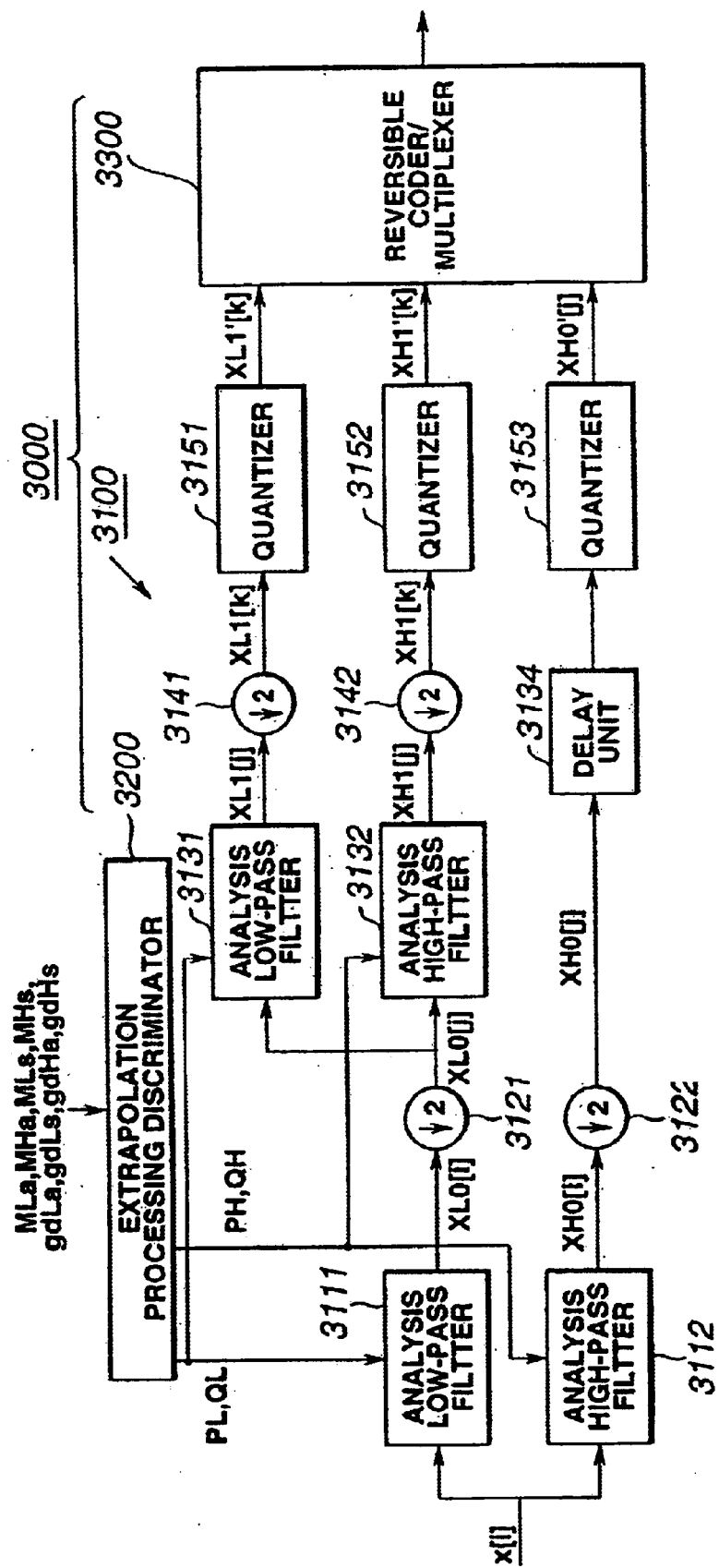
FIG. 14 is a block diagram showing the structure of essential portions of an encoding device in the second embodiment of the present invention.
Figure 15:
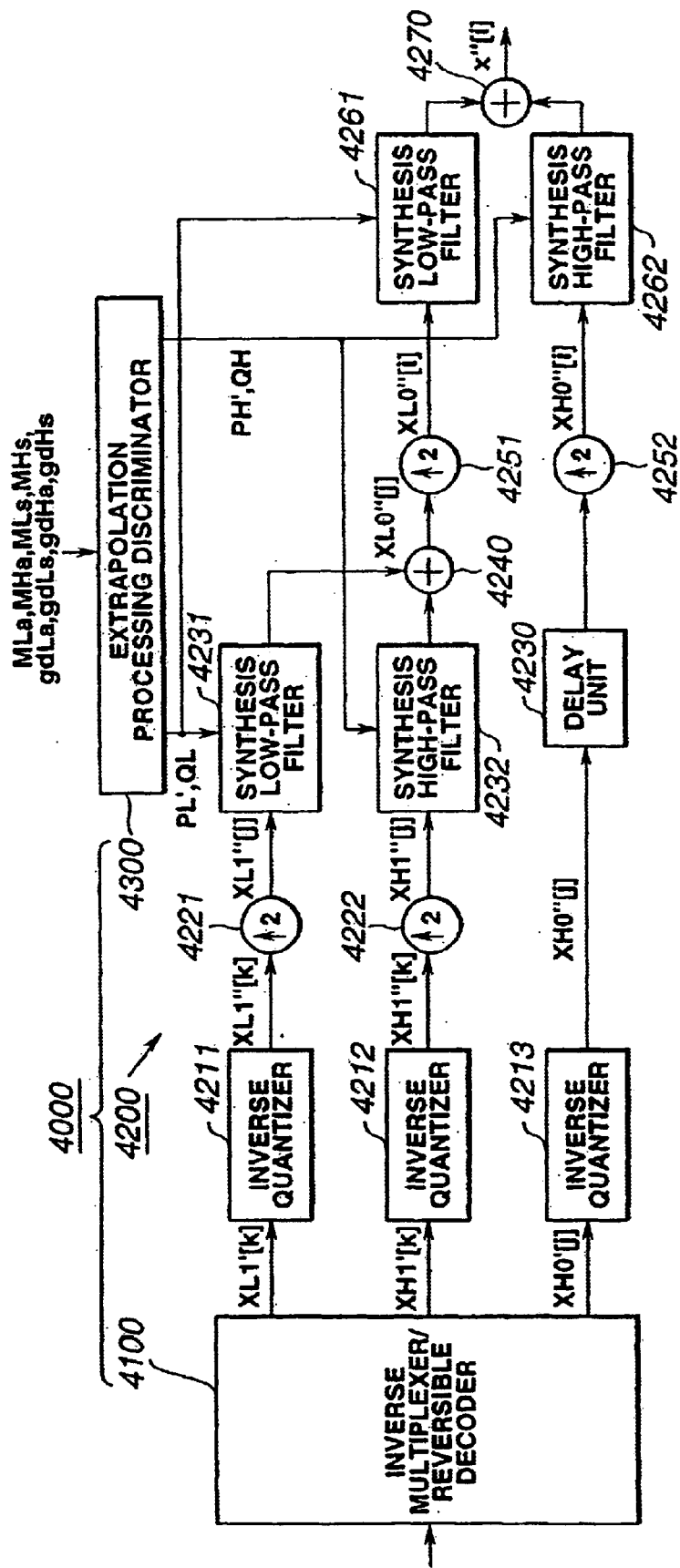
FIG. 15 is a block diagram showing the structure of essential portions of a decoding device in a third embodiment of the present invention.

In the third embodiment of the present invention shown in FIGS. 14 and 15, the present invention is applied to the encoding device 400 and the decoding device 500 shown in FIGS. 2 and 3, thus providing an encoding/decoding device for coding and decoding a one-dimensional data array.

An encoding device 3000 shown in FIG. 14 includes a wavelet transform unit 3100 for carrying out band division of an input signal x[i] into signals XL1'[k], XH1'[k], XH0'[j] of three frequency bands (subbands), an extrapolation processing discriminator 3200 for discriminating whether an extrapolation processing method for convolution at both ends of data with respect to band division processing by the wavelet transform unit 3100 is appropriate or not, and a reversible coder/multiplexer 3300 for carrying out reversible coding such as Huffman coding or arithmetic coding and multiplexing processing with respect to the signals XL1'[k], XH1'[k], XH0'[j] divided by the wavelet transform unit 3100.

The wavelet transform unit 3100 of the encoding device 3000 generates two subbands by one division, and sets the sampling interval of each down-sampling to 2. Octave division for further dividing a subband on the low-frequency side into two is repeated twice, and the number of input data arrays with respect to subband processing at each level is set to an even number. In this case, an appropriate loopback method is determined by the number of taps and group delay of each filter, as described in the first embodiment.

Before filtering processing by analysis low-pass filters 3111, 3131 and analysis high-pass filters 3112, 3132 on the respective stages is started in the wavelet transform unit 3100, the extrapolation processing discriminator 3200 discriminates whether or not the extrapolation processing satisfies complete reconstruction conditions, on the basis of the number of taps MLa, MHa and group delays gdLa, gdHa of the analysis filters used for the subband processing, the number of taps MLs, MHs and group delays gdLs, gdHs of the corresponding synthesis filters, and extrapolation processing methods PL, PH with respect to the leading end position and extrapolation processing methods QL, QH with respect to the trailing end position which are designated from outside. The extrapolation processing discriminator 3200 then notifies the analysis low-pass filters 3111, 3131 and the analysis high-pass filters 3112, 3132 on the respective stages, of the appropriate extrapolation processing methods PL, QL/PH, QH.

In the wavelet transform unit 3100, the analysis low-pass filter 3111 and the analysis high-pass filter 3112 on the first stage divide the input signal x[i] into a low-frequency band signal XL0[i] and a high-frequency band signal XH0[i]. The low-frequency band signal XL0[i] is supplied to a down-sampling unit 3121, which carries out down-sampling similar to Equation (13). A low-frequency band signal XL0[j] obtained on down-sampling by the down-sampling unit 3121 is further divided into a low-frequency band signal XL1[j] and a high-frequency band signal XH1[j] by the analysis low-pass filter 3131 and the analysis high-pass filter 3132 on the second stage. Then, the low-frequency band signal XL1[j] and the high-frequency band signal XH1[j] are supplied to down-sampling units 3141, 3142, respectively, which carry out down-sampling. On down-sampling by the down-sampling units 3141, 3142, a low-frequency band signal XL1[k] and a high-frequency band signal XH1[k] are generated.

On the other hand, the high-frequency band signal XH0[i] passed through the analysis high-pass filter 3112 on the first stage is supplied to a down-sampling unit 3122, which carries out down-sampling. Then, a high-frequency band signal XH0[j] obtained on down-sampling by the down-sampling unit 3122 is inputted to a delay unit 3134 for synchronizing with the low-frequency band signal.

The low-frequency band signal XL1[k] and the high-frequency band signal XH1[k] obtained on down-sampling by the down-sampling units 3141, 3142 and the high-frequency band signal XH0[j] delayed by the delay unit 3134 are inputted to quantizers 3151, 3152 and 3153, respectively, and quantized with corresponding quantization steps QL1, QH1 and QH0 as expressed by the following Equations (22), (23) and (24), respectively.

$$XL1'[k]=XL1[k]/QL1 \qquad \text{Equation (22)}$$

$$XH1'[k]=XH1[k]/QH1 \qquad \text{Equation (23)}$$

$$XH0'[j]=XH0[j]/QH0 \qquad \text{Equation (24)}$$

For rounding of decimal fractions in calculating these Equations, decimal fractions not greater than 4 are rounded down.

Quantized data XL1'[k], XH1'[k], XH0'[j] which are band-divided by the wavelet transform unit 3100 are inputted to the reversible coder/multiplexer 3300, where reversible coding such as Huffman coding or arithmetic coding and multiplexing are carried out on the quantized data. The data are then transmitted to a decoding device 4000 shown in FIG. 15 through a storage medium or a transmission line.

The decoding device 4000 shown in FIG. 15 includes an inverse multiplexer/reversible decoder 4100 for decoding an input signal correspondingly to the multiplexing and reversible coding carried out by the reversible coder/multiplexer 3300 of the encoding device 3000, an inverse wavelet transform unit 4200 for carrying out inverse transform of the processing by the wavelet transform unit 3100 of the encoding device 3000 with respect to the quantized data XL1'[k], XH1'[k], XH0'[j] restored from the input signal by the inverse multiplexer/reversible decoder 4100, and an extrapolation processing discriminator 4300 for discriminating whether an extrapolation processing method for convolution at both ends of data with respect to the band synthesis processing by the inverse wavelet transform unit 4200 is appropriate or not.

In the decoding device 4000 shown in FIG. 15, first, the inverse multiplexer/reversible decoder 4100 carries out decoding with respect to multiplexing and reversible coding carried out by the above-described encoding device 3000, so as to restore the quantized data XL1'[k], XH1'[k], XH0'[j]. The quantized data XL1'[k], XH1'[k], XH0'[j] are inputted to inverse quantizers 4211, 4212, 4213, respectively. The inverse quantizers 4211, 4212, 4213 carry out inverse transform of the quantization by the quantizers 3151, 3152, 3153 of the encoding device 3000, as expressed by the following Equations (25), (26) and (27).

$$XL1''[k] = XL1'[k] \times QL1 \qquad \text{Equation (25)}$$

$$XH1''[k] = XH1'[k] \times QH1 \qquad \text{Equation (26)}$$

$$XH0''[j] = XH0'[j] \times QH0 \qquad \text{Equation (27)}$$

Of output signals XL1"[k], XH1"[k], XH0"[j] of the inverse quantizers 4211, 4212, 4213, the low-frequency band signal XL1"[k] and the high-frequency band signal XH1"[k] corresponding to the band division on the second stage of the encoding device 3000 are inputted to up-sampling units 4221 and 4222, respectively, where up-sampling is carried out on the signals.

The low-frequency band signal XL1"[j] and the high-frequency band signal XH1"[j] obtained on up-sampling by the up-sampling units 4221, 4222 are inputted to an adder 4240 through a synthesis low-pass filter 423 1 and a synthesis high-pass filter 4232 having the relations of Equations (28) and (29) with the analysis low-pass filter 3111 and the analysis high-pass filter 3112, respectively.

$$H_0(-z)F_0(z) + H_1(-z)F_1(z) = 0 \qquad \text{Equation (28)}$$

$$H_0(z)F_0(z) + H_1(z)F_1(z) = 2z^{-L} \qquad \text{Equation (29)}$$

In Equations (28) and (29), $H_0(z)$, $H_1(z)$, $F_0(z)$ and $F_1(z)$ represent transfer functions of the analysis low-pass filter 3111, the analysis high-pass filter 3112, the synthesis low-pass filter 4231 and the synthesis high-pass filter 4232, respectively, and L is an arbitrary integer.

Then, the output signals from the synthesis low-pass filter 4231 and the synthesis high-pass filter 4232 are added by the adder 4240 so as to be a low-frequency band signal XL0"[j] corresponding to the low-frequency band signal XL0[j] obtained by the band division on the first stage of the encoding device 3000.

The high-frequency band signal XH0"[j], obtained by the inverse quantizer 4213 and corresponding to the band division on the first stage, is inputted to a delay unit 4230 and is delayed by the delay unit 4230 by the time necessary for reconstructing the low-frequency band signal XL0"[j] corresponding to the band division on the first stage.

The low-frequency band signal XL0"[j] obtained by the adder 4240 and the high-frequency band signal XH0"[j] delayed by the delay unit 4230 are supplied to up-sampling units 4251, 4252, respectively, where up-sampling is carried out on the signals. The frequency band signals XL0"[i], XH0"[i] obtained on up-sampling by the up-sampling units 4251, 4252 are filtered by a synthesis low-pass filter 4261 and a synthesis high-pass filter 4262, respectively, and are supplied to an adder 580. Then, these frequency band signals XL0"[j], XH0"[j] are added and synthesized by the adder 4270, thereby generating a restored signal x"[i] corresponding to the input signal x[i].

Before filtering processing by the synthesis low-pass filters 4231, 4261 and the synthesis high-pass filters 4232, 4262 on the respective stages is started in the inverse wavelet transform unit 4200, the extrapolation processing discriminator 4300 discriminates whether or not the extrapolation processing satisfies complete reconstruction conditions, on the basis of the number of taps MLa, MHa and group delays gdLa, gdha of the analysis filters used for the subband processing, the number of taps MLs, MHs and group delays gdLs, gdHs of the corresponding synthesis filters, and extrapolation processing methods PL', PH' with respect to the leading end position and extrapolation processing methods QL, QH with respect to the trailing end position which are designated from outside. The extrapolation processing discriminator 4300 then notifies the synthesis low-pass filters 4231, 4261 and the synthesis high-pass filters 4232, 4262 on the respective stages, of the appropriate extrapolation processing methods PL', QL/PH', QH.

In this case, as the analysis low-pass filters 3111, 3131, the analysis high-pass filters 3112, 3132, the synthesis low-pass filters 4231, 4261, and the synthesis high-pass filters 4232, 4262, the same combination is used for all division levels. However, different combinations of filters may be used for the respective levels.

If different filters are used for division or synthesis at the individual stages, the extrapolation processing discriminator 3200 discriminates extrapolation processing with respect to the individual filters, and notifies each filter of the appropriate extrapolation processing method.

In the third embodiment, too, offset units may be installed on the stage preceding the down-sampling units 3121, 3122, 3141, 3142 and the stage subsequent to the up-sampling units 4221, 4222, 4251, 4252 so as to adjust the offset, thereby discriminating the appropriate extrapolation processing, similarly to the second embodiment.

In addition, in the third embodiment, the extrapolation processing discriminators 3200, 4300 are provided in both the encoding device 3000 and the decoding device 4000. However, it is also possible to provide the extrapolation processing discriminator 3200 only in the encoding device 3000, then determine a loopback method for the synthesis filter, and notify the synthesis filter of the decoding device 4000 of the result of determination together with other information through the reversible coder/multiplexer 3300.

Moreover, the present invention may also be applied to coding of a two-dimensional picture, as described in the conventional example, and different filters may be used with respect to the horizontal and vertical directions. In this case, too, discrimination with respect to each filter is carried out by the extrapolation processing discriminators 3200, 4300, and the discrimination result is notified of to the corresponding filter, thereby enabling wavelet transform and inverse wavelet transform which satisfy complete reconstruction conditions as a whole, similarly to the case where different filters are used for division/synthesis at the individual levels in the third embodiment.

Also, the present invention may be applied to a moving picture coding system using motion compensation.

It is to be understood that the present invention is not limited to the above-described embodiments and that various other structures may be provided without departing from the scope of the present invention.

What is claimed is:

1. A data processing apparatus for performing signal processing on an input signal having a finite length and a sampling interval, comprising:
   a wavelet transform unit for performing a wavelet transform on said input signal, comprising:
   a plurality of analysis filters for filtering said input signal into a plurality of sub-bands; each analysis filter having a predetermined number of taps; said analysis filters also performing a leading end extrapolation process and a trailing end extrapolation process; and a plurality of downsampling units for downsampling the sampling interval of each sub-band to a downsampling interval;

a signal processor for signal processing the downsampled sub-bands;

an inverse wavelet transform unit for performing an inverse wavelet transform on the sub-bands processed by said signal processor, comprising:

a plurality of upsampling units for upsampling the sampling interval of each sub-band to an upsampling interval by inserting zero-valued data;

a plurality of synthesis filters for interpolating values for the zero-valued data in the upsampled sub-bands; each synthesis filter having said predetermined number of taps; said synthesis filters also performing said leading end extrapolation process and said trailing end extrapolation process; and an adder for adding the interpolated sub-bands to form an output signal; and an extrapolation processing discriminator for determining whether said leading end extrapolation process and said trailing end extrapolation process satisfy a complete reconstruction condition, whereby said output signal is a substantial reconstruction of said input signal; said extrapolation processing discriminator changing said leading end extrapolation process and said trailing end extrapolation process to default extrapolation processes if said complete reconstruction condition is not satisfied; said extrapolation processing discriminator being connected to said plurality of analysis filters and said plurality of synthesis filters.

2. The data processing apparatus according to claim 1, wherein said extrapolation processing discriminator determines whether said leading end extrapolation process and said trailing end extrapolation process satisfy said complete reconstruction condition on the basis of a process symmetry, said predetermined number of taps, a group delay of the analysis and synthesis filters, said downsampling interval, and said finite length of said input signal.

3. The data processing apparatus according to claim 1, wherein said leading end extrapolation process and said trailing end extrapolation process are one of four loopback processing methods; the four loopback processing methods being a zero-shift even function loopback method, a zero-shift odd function loopback method, a half-shift even function loopback method, and a half-shift odd function loopback method.

4. The data processing apparatus according to claim 1, wherein said extrapolation processing discriminator comprises a plurality of phase shift calculators, a periodicity discriminator, a plurality of symmetry discriminators, and a plurality of filter extrapolation processing discriminators.

5. The data processing apparatus according to claim 1, wherein said extrapolation processing discriminator suspends processing by said data processing apparatus if said complete reconstruction condition is not satisfied.

6. The data processing apparatus according to claim 1, wherein said signal processor performs quantization, variable length coding, signal transmission, variable length decoding, and inverse quantization on the downsampled sub-bands.

7. The data processing apparatus according to claim 1, wherein said input signal is a video signal.

8. The data processing apparatus according to claim 1, wherein said wavelet transform unit further comprises a first offset unit for offsetting said plurality of sub-bands by an offset quantity prior to downsampling; and said inverse wavelet transform unit further comprises a second offset unit for offsetting said plurality of sub-bands by said offset quantity after upsampling.

9. The data processing apparatus according to claim 8, wherein said extrapolation processing discriminator comprises a plurality of phase shift calculators, a periodicity discriminator, a plurality of symmetry discriminators, an offset discriminator, and a plurality of filter extrapolation processing discriminators; said offset discriminator providing said offset quantity to said first and second offset units.

10. A data processing apparatus for performing signal processing on an input signal having a finite length and a sampling interval, comprising:

a wavelet transform unit for performing a wavelet transform on said input signal, comprising:

a plurality of analysis filters for filtering said input signal into a plurality of sub-bands; each analysis filter having a predetermined number of taps; said analysis filters also performing a first leading end extrapolation process and a first trailing end extrapolation process;

a plurality of downsampling units for downsampling the sampling interval of each sub-band to a downsampling interval; and a first extrapolation processing discriminator for determining whether said first leading end extrapolation process and said first trailing end extrapolation process satisfy a complete reconstruction condition; said first extrapolation processing discriminator changing said first leading end extrapolation process and said first trailing end extrapolation process to default extrapolation processes if said complete reconstruction condition is not satisfied; said first extrapolation processing discriminator being connected to said plurality of analysis filters; a signal processor for signal processing the downsampled sub-bands; and an inverse wavelet transform unit for performing an inverse wavelet transform on the sub-bands processed by said signal processor, comprising:

a plurality of upsampling units for upsampling the sampling interval of each sub-band to an upsampling interval by inserting zero-valued data;

a plurality of synthesis filters for interpolating values for the zero-valued data in the upsampled sub-bands; each synthesis filter having said predetermined number of taps; said synthesis filters also performing a second leading end extrapolation process and a second trailing end extrapolation process;

an adder for adding the interpolated sub-bands to form an output signal; and a second extrapolation processing discriminator for determining whether said second leading end extrapolation process and said second trailing end extrapolation process satisfy said complete reconstruction condition whereby said output signal is a substantial reconstruction of said input signal; said second extrapolation processing discriminator changing said second leading end extrapolation process and said second trailing end extrapolation process to default extrapolation processes if said complete reconstruction condition is not satisfied;

said second extrapolation processing discriminator being connected to said plurality of synthesis filters.

11. The data processing apparatus according to claim 10, wherein said first extrapolation processing discriminator determines whether the first leading and trailing end extrapolation processes satisfy said complete reconstruction condition on the basis of a process symmetry, said predetermined number of taps, a group delay of the analysis and synthesis filters, and said finite length of said input signal; and said second extrapolation processing discriminator determines whether the second leading and trailing end extrapolation processes satisfy said complete reconstruction condition on the basis of a process symmetry, said predetermined number of taps, a group delay of the analysis and synthesis filters, and said finite length of said input signal.

12. The data processing apparatus according to claim 10, wherein said first and second leading end extrapolation processes and said first and second trailing end extrapolation processes are one of four loopback processing methods; the four loopback processing methods being a zero-shift even function loopback method, a zero-shift odd function loopback method, a half-shift even function loopback method, and a half-shift odd function loopback method.

13. The data processing apparatus according to claim 10, wherein said first and second extrapolation processing discriminators each comprising a plurality of phase shift calculators, a periodicity discriminator, a plurality of symmetry discriminators, and a plurality of filter extrapolation processing discriminators.

14. The data processing apparatus according to claim 10, wherein said first and second extrapolation processing discriminators suspend processing by said data processing apparatus if said complete reconstruction condition is not satisfied.

15. The data processing apparatus according to claim 10, wherein said signal processor performs quantization, variable length coding, signal transmission, variable length decoding, and inverse quantization on the downsampled sub-bands.

16. The data processing apparatus according to claim 10, wherein said input signal is a video signal.

17. A data processing method of performing signal processing on an input signal having a finite length and a sampling interval, comprising the steps of:

performing a wavelet transform on said input signal using a wavelet transform unit, comprising the steps of:
filtering said input signal into a plurality of sub-bands using a plurality of analysis filters; each analysis filter having a predetermined number of taps; said analysis filters also performing a leading end extrapolation process and a trailing end extrapolation process; and
downsampling the sampling interval of each sub-band to a downsampling interval using a plurality of downsampling units;
signal processing the downsampled sub-bands using a signal processor;
performing an inverse wavelet transform on the sub-bands processed in said signal processing step using an inverse wavelet transform unit, comprising the steps of:
upsampling the sampling interval of each sub-band to an upsampling interval by inserting zero-valued data using a plurality of upsampling units;
interpolating values for the zero-valued data in the upsampled sub-bands using a plurality of synthesis filters; each synthesis filter having said predetermined number of taps; said synthesis filters also performing said leading end extrapolation process and said trailing end extrapolation process; and
adding the interpolated sub-bands to form an output signal; and
determining whether said leading end extrapolation process and said trailing end extrapolation process satisfy a complete reconstruction condition using an extrapolation processing discriminator, whereby said output signal is a substantial reconstruction of said input signal; said determining step changing said leading end extrapolation process and said trailing end extrapolation process to default extrapolation processes if said complete reconstruction condition is not satisfied; said extrapolation processing discriminator being connected to said plurality of analysis filters and said plurality of synthesis filters.

18. The data processing method according to claim 17, wherein said determining step determines whether said leading end extrapolation process and said trailing end extrapolation process satisfy said complete reconstruction condition on the basis of a process symmetry, said predetermined number of taps, a group delay of the analysis and synthesis filters, said downsampling interval, and said finite length of said input signal.

19. The data processing method according to claim 17, wherein said leading end extrapolation process and said trailing end extrapolation process are one of four loopback processing methods; the four loopback processing methods being a zero-shift even function loopback method, a zero-shift odd function loopback method, a half-shift even function loopback method, and a half-shift odd function loopback method.

20. The data processing method according to claim 17, wherein said extrapolation processing discriminator comprises a plurality of phase shift calculators, a periodicity discriminator, a plurality of symmetry discriminators, and a plurality of filter extrapolation processing discriminators.

21. The data processing method according to claim 17, wherein said determining step suspends processing by said data processing method if said complete reconstruction condition is not satisfied.

22. The data processing method according to claim 17, wherein said signal processing step performs quantization, variable length coding, signal transmission, variable length decoding, and inverse quantization on the downsampled sub-bands.

23. The data processing method according to claim 17, wherein said input signal is a video signal.

24. The data processing method according to claim 17, wherein said wavelet transform step further comprises a first offsetting step of offsetting said plurality of sub-bands by an offset quantity prior to downsampling; and said inverse wavelet transform step further comprises a second offsetting step of offsetting said plurality of sub-bands by said offset quantity after upsampling.

25. The data processing method according to claim 24, wherein said extrapolation processing discriminator comprises a plurality of phase shift calculators, a periodicity discriminator, a plurality of symmetry discriminators, an offset discriminator, and a plurality of filter extrapolation processing discriminators; said offset discriminator providing said offset quantity for said first and second offsetting steps.

26. A data processing method for performing signal processing on an input signal having a finite length and a sampling interval, comprising the steps of:

performing a wavelet transform on said input signal using a wavelet transform unit, comprising the steps of:
filtering said input signal into a plurality of sub-bands using a plurality of analysis filters; each analysis filter having a predetermined number of taps; said analysis filters also performing a first leading end extrapolation process and a first trailing end extrapolation process;
downsampling the sampling interval of each sub-band to a downsampling interval using a plurality of downsampling units; and
a first determining step of determining whether said first leading end extrapolation process and said first trailing end extrapolation process satisfy a complete reconstruction condition using a first extrapolation processing discriminator; said first determining step changing said first leading end extrapolation process and said first trailing end extrapolation process to default extrapolation processes if said complete reconstruction condition is not satisfied; said first extrapolation processing discriminator being connected to said plurality of analysis filters;
signal processing the downsampled sub-bands using a signal processor; and
performing an inverse wavelet transform on the sub-bands processed in said signal processing step using an inverse wavelet transform unit, comprising the steps of:
upsampling the sampling interval of each sub-band to an upsampling interval by inserting zero-valued data using a plurality of upsampling units;
interpolating values for the zero-valued data in the upsampled sub-bands using a plurality of synthesis filters; each synthesis filter having said predetermined number of taps; said synthesis filters also performing a second leading end extrapolation process and a second trailing end extrapolation process;
adding the interpolated sub-bands to form an output signal; and
a second determining step of determining whether said second leading end extrapolation process and said second trailing end extrapolation process satisfy said complete reconstruction condition using a second extrapolation processing discriminator, whereby said output signal is a substantial reconstruction of said input signal; said second determining step changing said second leading end extrapolation process and said second trailing end extrapolation process to default extrapolation processes if said complete reconstruction condition is not satisfied;
said second extrapolation processing discriminator being connected to said plurality of synthesis filters.

27. The data processing method according to claim 26, wherein said first determining step determines whether the first leading and trailing end extrapolation processes satisfy said complete reconstruction condition on the basis of a process symmetry, said predetermined number of taps, a group delay of the analysis and synthesis filters, and said finite length of said input signal; and
said second determining step determines whether the second leading and trailing end extrapolation processes satisfy said complete reconstruction condition on the basis of a process symmetry, said predetermined number of taps, a group delay of the analysis and synthesis filters, and said finite length of said input signal.

28. The data processing method according to claim 26, wherein said first and second leading end extrapolation processes and said first and second trailing end extrapolation processes are one of four loopback processing methods; the four loopback processing methods being a zero-shift even function loopback method, a zero-shift odd function loopback method, a half-shift even function loopback method, and a half-shift odd function loopback method.

29. The data processing method according to claim 26, wherein said first and second extrapolation processing discriminators each comprising a plurality of phase shift calculators, a periodicity discriminator, a plurality of symmetry discriminators, and a plurality of filter extrapolation processing discriminators.

30. The data processing method according to claim 26, wherein said first and second determining steps suspend processing by said data processing method if said complete reconstruction condition is not satisfied.

31. The data processing method according to claim 26, wherein said signal processing step performs quantization, variable length coding, signal transmission, variable length decoding, and inverse quantization on the downsampled sub-bands.

32. The data processing method according to claim 26, wherein said input signal is a video signal.

* * * * *